United States Patent
Iida et al.

(10) Patent No.: US 8,593,599 B2
(45) Date of Patent: Nov. 26, 2013

(54) LIQUID CRYSTAL PANEL AND LIQUID CRYSTAL DISPLAY

(75) Inventors: Toshiyuki Iida, Ibaraki (JP); Tomoyuki Hirayama, Ibaraki (JP); Yutaka Ohmori, Ibaraki (JP); Miyuki Kurogi, Ibaraki (JP); Hisae Shimizu, Ibaraki (JP); Junichi Nagase, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 426 days.

(21) Appl. No.: 12/856,075

(22) Filed: Aug. 13, 2010

(65) Prior Publication Data

US 2011/0176092 A1    Jul. 21, 2011

(30) Foreign Application Priority Data

Aug. 15, 2009  (JP) ................................. 2009-188160
Jul. 23, 2010  (JP) ................................. 2010-165512

(51) Int. Cl.
  *G02F 1/1335*       (2006.01)
(52) U.S. Cl.
  USPC .............................. 349/117; 349/118; 349/96
(58) Field of Classification Search
  USPC .................... 349/118, 117, 119, 96
  See application file for complete search history.

(56) References Cited

U.S. PATENT DOCUMENTS

| | | | |
|---|---|---|---|
| 4,123,454 A | 10/1978 | Buxbaum | |
| 4,617,370 A | 10/1986 | Lenz et al. | |
| 4,654,412 A | 3/1987 | Calundann et al. | |
| 4,789,755 A | 12/1988 | Van Sickle et al. | |

(Continued)

FOREIGN PATENT DOCUMENTS

| | | |
|---|---|---|
| EP | 1387210 A1 | 2/2004 |
| JP | 62-121722 A | 6/1987 |

(Continued)

OTHER PUBLICATIONS

Japanese Office Action dated Dec. 21, 2012, issued in Japanese patent application No. 2009-100128 corresponding to U.S. Appl. No. 12/721,901, which is a co-pending application w/ the present application, w/ English translation.

(Continued)

*Primary Examiner* — Thoi Duong
(74) *Attorney, Agent, or Firm* — Westerman, Hattori, Daniels & Adrian, LLP

(57) ABSTRACT

[Object]
The present invention provides a liquid crystal panel with which a display with extremely small change in color depending on a viewing direction can be realized, and a liquid crystal display including the same.
[Solution to Problem]
The liquid crystal panel includes: a first polarizer 30; a second polarizer 50; a first optical compensation layer 60; a second optical compensation layer 70; and a liquid crystal cell 40. The first polarizer 30 is arranged on one surface of the liquid crystal cell 40. The second polarizer 50 is arranged on the other surface of the liquid crystal cell 40. The first optical compensation layer 60 is arranged between the liquid crystal cell 40 and the first polarizer 30. The second optical compensation layer 70 is arranged between the liquid crystal cell 40 and the second polarizer 50. The first optical compensation layer 60 satisfies the following mathematical formulae (1) and (2). The second optical compensation layer satisfies the following mathematical formulae (3) and (4).

$$nx > ny \geq nz \quad (1)$$

$$(Re[450]/Re[550]) < 1.00 \quad (2)$$

$$nx \geq ny > nz \quad (3)$$

$$(Rth[450]/Rth[550]) \geq 1.10 \quad (4)$$

18 Claims, 4 Drawing Sheets

(56) References Cited

U.S. PATENT DOCUMENTS

| | | |
|---|---|---|
| 4,801,677 A | 1/1989 | Eckhardt et al. |
| 4,985,532 A | 1/1991 | Pakull et al. |
| 5,344,916 A | 9/1994 | Harris et al. |
| 5,480,964 A | 1/1996 | Harris et al. |
| 5,580,950 A | 12/1996 | Harris et al. |
| 5,614,599 A | 3/1997 | Bales et al. |
| 5,804,634 A | 9/1998 | Umetsu et al. |
| 5,989,758 A | 11/1999 | Komatsu et al. |
| 6,046,300 A | 4/2000 | Umetsu et al. |
| 6,075,114 A | 6/2000 | Umetsu et al. |
| 6,610,219 B2 | 8/2003 | McGinniss et al. |
| 6,795,246 B2 | 9/2004 | Yano et al. |
| 6,853,424 B2 | 2/2005 | Elman et al. |
| 7,012,663 B2 * | 3/2006 | Ono et al. ............ 349/118 |
| 7,052,747 B2 | 5/2006 | Nishikouji et al. |
| 7,087,682 B2 | 8/2006 | Tadros et al. |
| 7,270,858 B2 | 9/2007 | Yamaoka et al. |
| 7,462,381 B2 | 12/2008 | Yoshimi et al. |
| 7,494,689 B2 | 2/2009 | Hayashi et al. |
| 7,625,612 B2 | 12/2009 | Ohmori et al. |
| 2004/0021815 A1 | 2/2004 | Elman |
| 2004/0027521 A1 | 2/2004 | Elman et al. |
| 2004/0223103 A1 | 11/2004 | Elman |
| 2005/0096431 A1 | 5/2005 | Fujii et al. |
| 2006/0082708 A1 | 4/2006 | Nagase et al. |
| 2006/0177607 A1 | 8/2006 | Ohmori et al. |
| 2006/0229428 A1 | 10/2006 | Shaikh et al. |
| 2007/0273816 A1 | 11/2007 | Kitagawa et al. |
| 2009/0046228 A1 | 2/2009 | Takeda et al. |
| 2009/0116109 A1 | 5/2009 | Konishi et al. |
| 2010/0020279 A1 | 1/2010 | Nagase et al. |
| 2010/0159158 A1 | 6/2010 | Shibata et al. |
| 2010/0188749 A1 | 7/2010 | Hirayama et al. |
| 2010/0265579 A1 | 10/2010 | Iida et al. |
| 2010/0304110 A1 | 12/2010 | Iida et al. |
| 2010/0328772 A1 | 12/2010 | Hirayama et al. |
| 2011/0013278 A1 | 1/2011 | Hirayama et al. |
| 2011/0176092 A1 | 7/2011 | Iida et al. |
| 2012/0081785 A1 | 4/2012 | Iida et al. |

FOREIGN PATENT DOCUMENTS

| | | |
|---|---|---|
| JP | 1-240517 A1 | 9/1989 |
| JP | 1240517 A | 9/1989 |
| JP | 3-014882 A | 1/1991 |
| JP | 3-500412 A | 1/1991 |
| JP | 3-122137 A | 5/1991 |
| JP | 7-233249 A | 9/1995 |
| JP | 8-134336 A | 5/1996 |
| JP | 11-271529 A | 10/1999 |
| JP | 2001-343529 A | 12/2001 |
| JP | 2002-311240 A | 10/2002 |
| JP | 3417949 B2 | 6/2003 |
| JP | 2003-315538 A | 11/2003 |
| JP | 2004-70329 A | 3/2004 |
| JP | 3984277 B2 | 10/2007 |
| JP | 2008-3559 A | 1/2008 |
| JP | 2008-003559 A | 1/2008 |
| JP | 2008-33285 A | 2/2008 |
| JP | 2008-170514 A | 7/2008 |
| JP | 2008-535977 A | 9/2008 |
| KR | 2010-0093084 | 8/2010 |
| WO | 89/03380 A1 | 4/1989 |
| WO | 94/24191 A1 | 10/1994 |
| WO | 97/22649 A1 | 6/1997 |
| WO | 2001-037007 A1 | 5/2001 |
| WO | 2007/132816 A1 | 11/2007 |

OTHER PUBLICATIONS

International Search Report of PCT/JP2009/051272, mailing date of Apr. 28, 2009.

Korean Office Action dated Jan. 9, 2012, issued in corresponding Korean Patent Application No. 2010-0026645.

Taiwanese Office Action dated Oct. 18, 2012, issued in correspondoing Taiwanese Patent Application No. 098103567 (Japanese Translation Only) 3 pages.

* cited by examiner

LIQUID CRYSTAL PANEL AND LIQUID CRYSTAL DISPLAY

CROSS-REFERENCE TO RELATED APPLICATION

This application claims priority from Japanese Patent Applications No. 2009-188160 (application date: Aug. 15, 2009) and No. 2010-165512 (application date: Jul. 23, 2010). The entire subject matters of the Japanese Patent Applications are incorporated herein by reference.

BACKGROUND OF THE INVENTION

1. Field of the Invention

The present invention relates to a liquid crystal panel and a liquid crystal display.

2. Description of Related Art

Accompanying the increase in resolution and performance enhancement of liquid crystal displays, uniformity in a display screen and further improvement in display quality have been required. In particular, there has been a demand for a liquid crystal display that is free from coloring occurred depending on a viewing direction (angle). However, with conventional liquid crystal displays, it has been difficult to provide a neutral display that is free from coloring in every direction.

In order to provide a neutral display that is free from coloring in every direction in a liquid crystal display, for example, a liquid crystal panel including a first birefringence layer in which a Nz coefficient defined by Nz=(nx−nz)/(nx−ny) has a relationship satisfying 1<Nz≤2 and a second birefringence layer having a refractive index distribution satisfying nx=ny>nz has been proposed (JP 2008-3559 A). Further, a liquid crystal panel including a liquid crystal cell having a relationship satisfying 0.8<Re[450]/Re[550]<1, a first optical compensation layer having a Nz coefficient in the range of 0.8 to 1.4 and having a relationship satisfying 0.8<Re[450]/Re[550]<1, and a second optical compensation layer satisfying nx=ny>nz and having a relationship satisfying 0.98<Re[450]/Re[550]<1.04 has been proposed (JP 2008-170514 A).

SUMMARY OF THE INVENTION

However, in recent years, accompanying the demand for a thinner liquid crystal cell and the increase in screen size of a liquid crystal display, it has been required that a change in color depending on a viewing direction is further reduced.

The liquid crystal panel of the present invention includes: a first polarizer; a second polarizer; a first optical compensation layer; a second optical compensation layer; and a liquid crystal cell. The first polarizer is arranged on one surface of the liquid crystal cell, and the second polarizer is arranged on the other surface of the liquid crystal cell. The first optical compensation layer is arranged between the liquid crystal cell and the first polarizer, and the second optical compensation layer is arranged between the liquid crystal cell and the second polarizer. The first optical compensation layer satisfies the following mathematical formulae (1) and (2), and the second optical compensation layer satisfies the following mathematical formulae (3) and (4).

$$nx > ny \geq nz \quad (1)$$

$$(Re[450]/Re[550]) < 1.00 \quad (2)$$

$$nx \geq ny > nz \quad (3)$$

$$(Rth[450]/Rth[550]) \geq 1.10 \quad (4)$$

In the mathematical formulae (1), (2), (3), and (4), nx denotes a maximum refractive index in a plane direction of each of the first optical compensation layer and the second optical compensation layer, ny denotes a refractive index in a direction that is orthogonal to the nx direction in the plane direction of each of the first optical compensation layer and the second optical compensation layer, and nz denotes a refractive index in the thickness direction of each of the first optical compensation layer and the second optical compensation layer, which is orthogonal to each of the nx and ny directions. Re[450] denotes an in-plane retardation Re (nm) of the first optical compensation layer at a light wavelength of 450 nm. Re[550] denotes an in-plane retardation Re (nm) of the first optical compensation layer at a light wavelength of 550 nm. The in-plane retardation Re (nm) is expressed by the following mathematical formula (5). Rth[450] denotes a retardation Rth (nm) in a thickness direction of the second optical compensation layer at a light wavelength of 450 nm. Rth[550] denotes a retardation Rth (nm) in the thickness direction of the second optical compensation layer at a wavelength of 550 nm. The retardation Rth (nm) is expressed by the following mathematical formula (6)

$$Re = (nx - ny) \times d \quad (5)$$

$$Rth = (nx - nz) \times d \quad (6)$$

In the mathematical formulae (5) and (6), d denotes each of thicknesses (nm) of the first optical compensation layer and the second optical compensation layer, and nx, ny, and nz denote the same as those in the mathematical formulae (1), (2), (3), and (4).

The liquid crystal display of the present invention includes the liquid crystal panel of the present invention.

By employing the above-described configuration in the liquid crystal panel of the present invention, a change in color depending on a viewing direction becomes extremely small. For example, in the liquid crystal display including a thin liquid crystal cell and a large-screen liquid crystal display, the problem of change in color depending on a viewing direction tends to be significant. However, the present invention is sufficiently applicable to such liquid crystal display. It is to be noted that the liquid crystal panel of the present invention is not limited by the liquid crystal panel including a thin liquid crystal cell and the large-screen liquid crystal display, and may be applicable to any liquid crystal display.

DETAILED DESCRIPTION OF THE INVENTION

Figure 1:
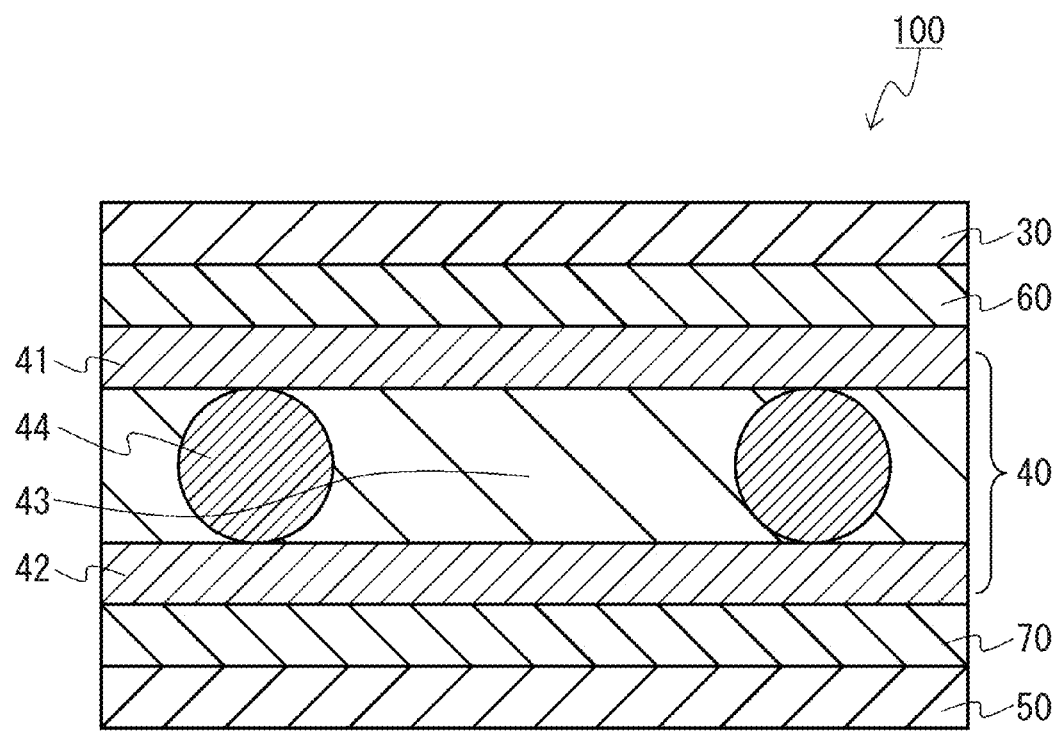
FIG. 1 is a sectional view illustrating a configuration of a liquid crystal panel of the present invention.

Embodiments illustrating the present invention are described below with reference to drawings.

In the liquid crystal panel of the present invention, it is preferable that the liquid crystal cell is a VA mode liquid crystal cell or an OCB mode liquid crystal cell. Further, it is preferable that the liquid crystal cell includes a liquid crystal layer, and the liquid crystal layer contains liquid crystal molecules that are in homeotropic alignment in a state where no electrical field is present.

In the liquid crystal panel of the present invention, a transmittance of the second optical compensation layer at the wavelength of 400 nm is preferably 90% or more, more preferably 92% or more. In the present invention, when the scope of the invention is defined by numerical values, the scope encompasses not only the exact numerical range but also the approximate numerical range. For example, in the mathematical formula (4), Rth[450]/Rth[550] includes exactly 1.10 or more, and also includes approximately 1.10 or more. Further, for example, "90% or more" of transmittance of the second compensation layer at the wavelength of 400 nm includes exactly 90% or more, and also includes approximately 90% or more.

In the liquid crystal panel of the present invention, it is preferable that the second optical compensation layer includes at least one selected from the group consisting of a polymer having repeating units represented by the following chemical formula (I), a polymer having repeating units represented by the following chemical formula (IA), and stereoisomers thereof.

groups, p1, p2, p3, and p4 are integers of 1 to 3, and are identical to or different from each other, and l and m are integers of 1 or more, and are identical to or different from each other. In the chemical formula (IA), X is any substituent, q is an integer of 0 to 4, which represents the number of substituents in X, when multiple Xs are present, they are identical to or different from each other, $n_a$ is an integer of 2 or more, $R^a$ is a group represented by the following chemical formula (IIA), and $m_a$ is an integer of 0 or 1.

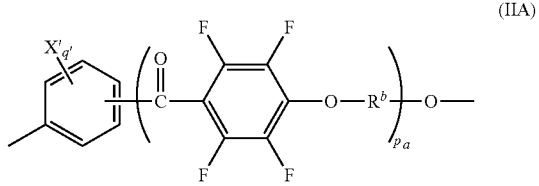

(IIA)

In the chemical formula (IIA), X' is any substituent, q' is an integer of 0 to 4, which represents the number of substituents in X', when multiple X's are present, they are identical to or different from each other, $R^b$ is a divalent aromatic group, and $p_a$ is an integer of 0 or 1.

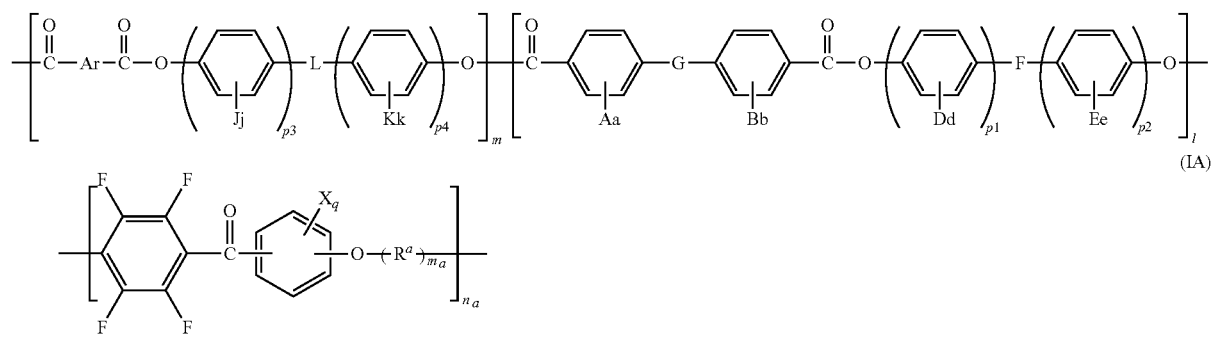

In the chemical formula (I), A, B, D, E, J, and K are any substituents, and are identical to or different from each other, a, b, d, e, j and k are integers of 0 to 4, which represent the numbers of substituents in A, B, D, E, J, and K, respectively, and are identical to or different from each other, F and L are each a single bond, a vinylene group (—CH=CH—), an ethynylene group (—C≡C—), a methylene group (—CH$_2$—), —CR$_2$— (where Rs are each a straight or brunched alkyl group with a carbon number of 1 to 6 or a substituted or unsubstituted aryl group, and are identical to or different from each other), —C(CZ$_3$)$_2$— (where Zs are halogens), a carbonyl group (—CO—), an O atom, a S atom, a sulfonyl group (—SO$_2$—), —SiR$_2$— (where Rs are each a straight or brunched alkyl group with a carbon number of 1 to 6 or a substituted or unsubstituted aryl group, and are identical to or different from each other), or —NR— (where R is a straight or brunched alkyl group with a carbon number of 1 to 6 or a substituted or unsubstituted aryl group, and are identical to or different from each other), F and L are identical to or different from each other, G is an atomic group which is capable of π-conjugating to both benzene rings that are adjacent to G or a single bond, Ar is an aromaticity atomic group or an atomic group in which multiple aromaticity atomic groups are bound to each other via bonds or atomic groups which are capable of π-conjugating to each of the aromatic In the present invention, the alkyl group is not particularly limited, and examples thereof include a methyl group, an ethyl group, a n-propyl group, an isopropyl group, a n-butyl group, an isobutyl group, a sec-butyl group, and a tert-butyl group. The same applies to a group having an alkyl group in the structure thereof (for example, a halogenated alkyl group, an alkoxy group, and an alkoxy carbonyl group). In the present invention, the acyl group is not particularly limited, and examples thereof include a formyl group, an acetyl group, a propionyl group, an isobutyryl group, a valeryl group, an isovaleryl group, a pivaloyl group, a hexanoyl group, a cyclohexanoyl group, a benzoyl group, and an ethoxy carbonyl group. The same applies to a group having an acyl group in the structure thereof (for example, an acyloxy group and an alkanoyloxy group). Further, in the present invention, the number of carbons in an acyl group includes the number of carbonyl carbons. For example, an alkanoyl group (an acyl group) with a carbon number of 1 indicates a formyl group. In the present invention, "halogen" is any halogen element, and examples thereof include fluorine, chlorine, bromine, and iodine.

In the chemical formula (I), it is preferable that F and L are each a single bond, a vinylene group (—CH=CH—), an ethynylene group (—C≡C—), a methylene group (—CH$_2$—), —CR$_2$— (where Rs are each a straight or brunched alkyl group with a carbon number of 1 to 6 or a substituted or unsubstituted aryl group, and are identical to or different from each other), —C(CZ₃)₂— (where Zs are halochemical formula (V); a polymer having repeating units represented by the following chemical formula (VI); and stereoisomers thereof.

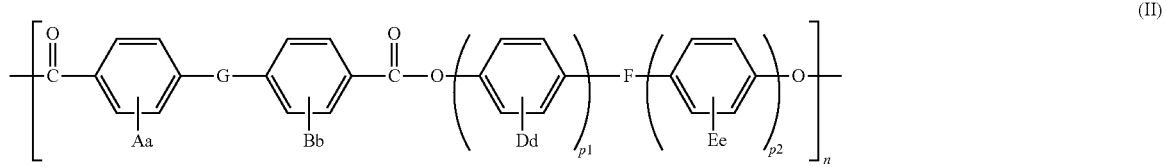

(II)

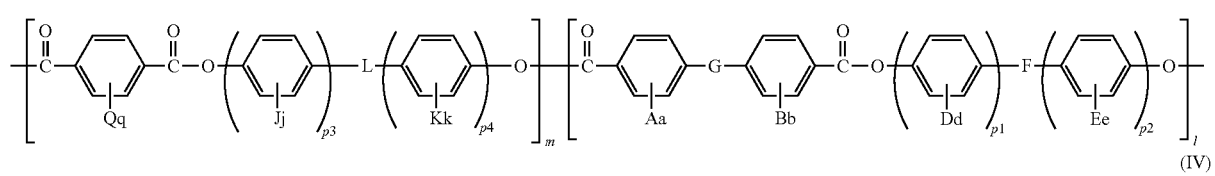

(III)

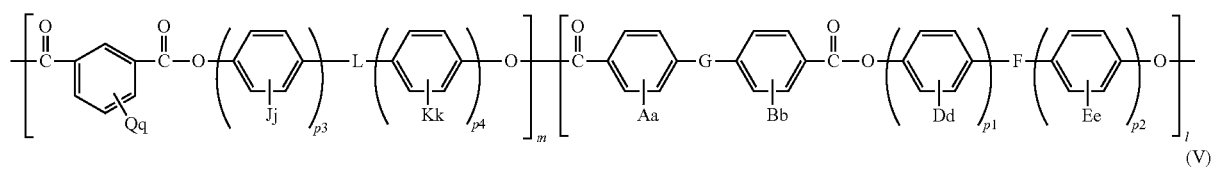

(IV)

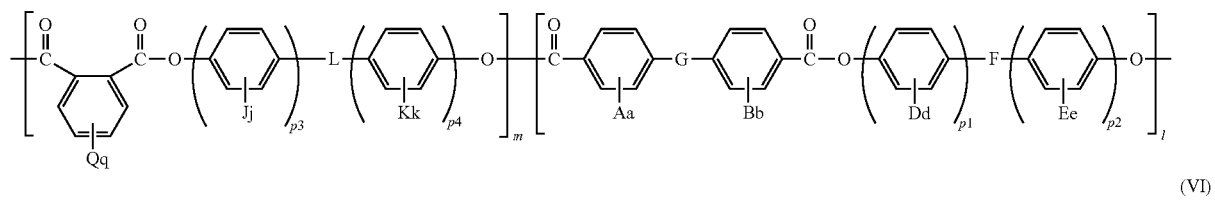

(V)

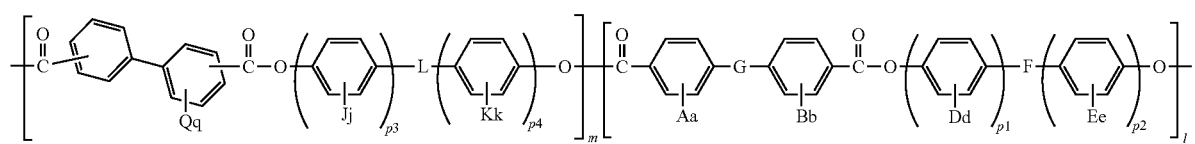

(VI)

gens), a carbonyl group (—CO—), an O atom, a S atom, a sulfonyl group (—SO₂—), a diethyl silylene group (—Si(CH₂CH₃)₂—), or a methylimino group (—N(CH₃)—).

In the chemical formula (I), it is preferable that A, B, D, E, J, and K are each a hydrogen atom, a halogen atom, a straight or branched alkyl group with a carbon number of 1 to 6, or a substituted or unsubstituted aryl group. In this case, A, B, D, E, J, and K are identical to or different from each other. As the halogen atom, a fluorine atom is particularly preferable. The straight or branched alkyl group with a carbon number of 1 to 6 is more preferably a straight or branched alkyl group with a carbon number of 1 to 4, yet more preferably a methyl group, an ethyl group, a propyl group, an isopropyl group, a butyl group, an isobutyl group, a sec-butyl group, or a tert-butyl group, and particularly preferably a methyl group or an ethyl group. When multiple As are present in the chemical formula (I), they are identical to or different from each other. The same applies to B, D, E, J, and K.

In the liquid crystal panel of the present invention, it is more preferable that the polymer having repeating units: represented by the chemical formula (I) is at least one selected from the group consisting of a polymer having repeating units represented by the following chemical formula (II); a polymer having repeating units represented by the following chemical formula (III); a polymer having repeating units represented by the following chemical formula (IV); a polymer having repeating units represented by the following In the chemical formulae (II), (III), (IV), (V), and (VI), A, B, D, E, a, b, d, e, F, G, p1, and p2 are the same as those in the chemical formula (I). In the chemical formula (II), n is an integer of 2 or more. In the chemical formulae (III), (IV), (V), and (VI), J, K, j, k, L, p3, p4, l, and m are the same as those in the chemical formula (I). Q is any substituent, and is identical to or different from each of A, B, D, E, J, and K. q is an integer of 0 to 4, which represents the number of substituents in Q, and is identical to or different from each of a, b, d, e, j, and k.

In the chemical formulae (III), (IV), (V), and (VI), it is more preferable that Q is at least one selected from the group consisting of a hydrogen atom, a halogen atom, a straight or branched alkyl group with a carbon number of 1 to 6, and a substituted or unsubstituted aryl group.

It is still more preferable that the polymer having repeating units represented by the chemical formula (I) is at least one selected from the group consisting of: a polymer having repeating units represented by the following chemical formula (VII); a polymer having repeating units represented by the following chemical formula (VIII); polymer having repeating units represented by the following chemical formula (IX); a polymer having repeating units represented by the following chemical formula (X); a polymer having repeating units represented by the following chemical formula (XI);

a polymer having repeating units represented by the following chemical formula (VIIB); a polymer having repeating units represented by the following chemical formula (VIIIB); a polymer having repeating units represented by the following chemical formula (IXB); a polymer having repeating units represented by the following chemical formula (XB); a polymer having repeating units represented by the following chemical formula (XIB); and stereoisomers thereof.

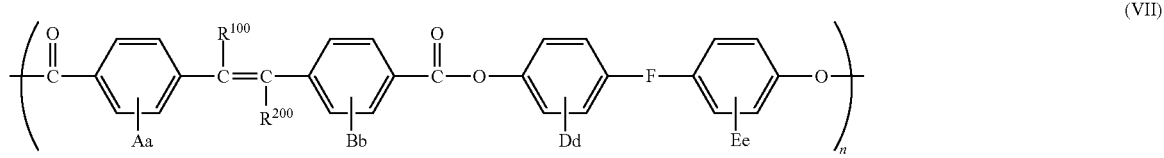

(VII)

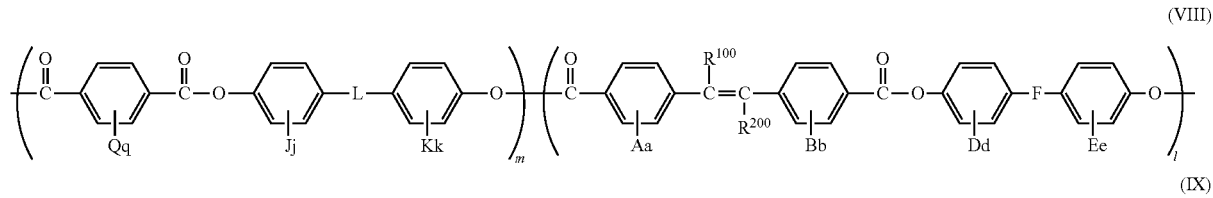

(VIII)

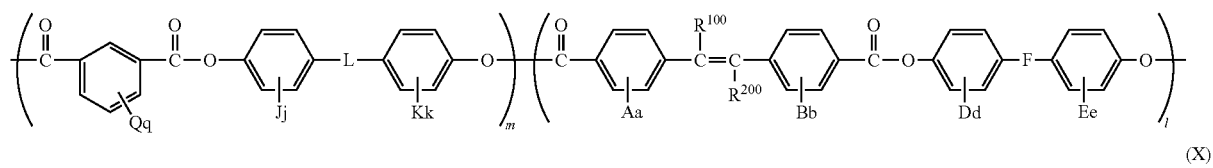

(IX)

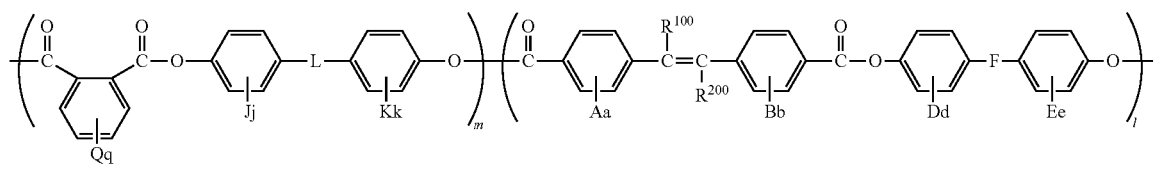

(X)

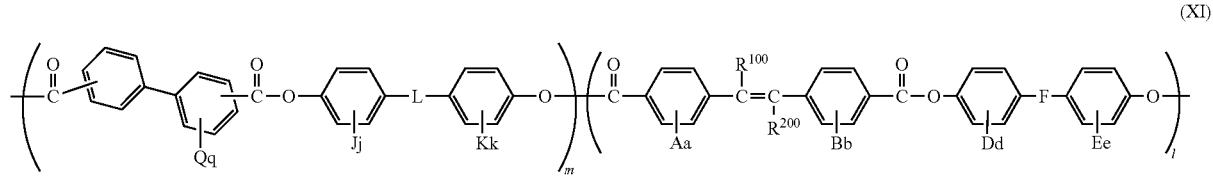

(XI)

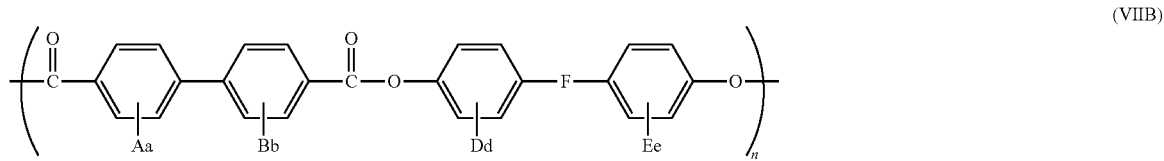

(VIIB)

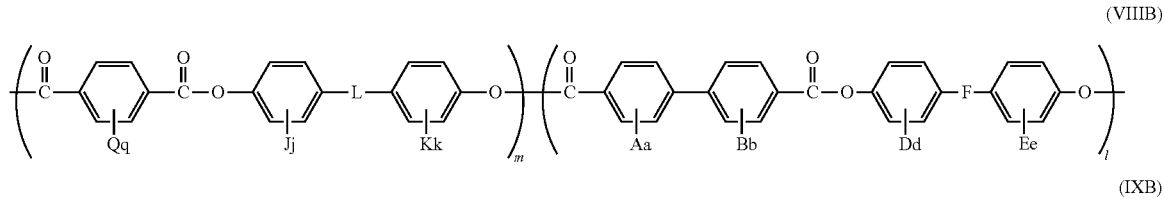

(VIIIB)

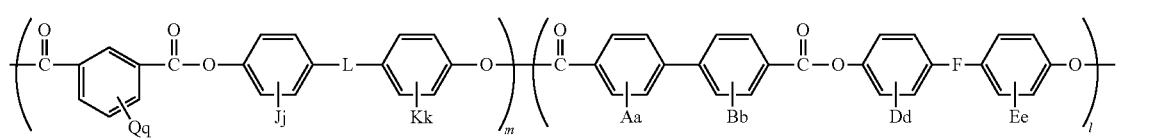

(IXB)

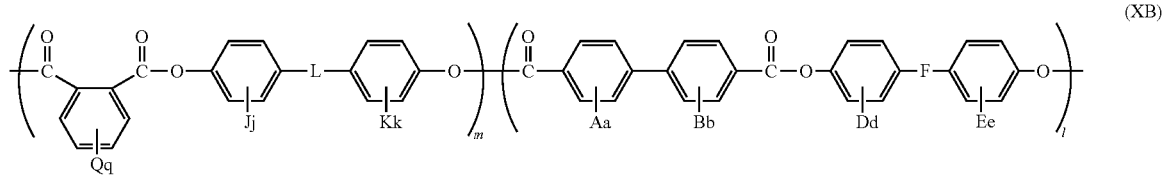

(XB)

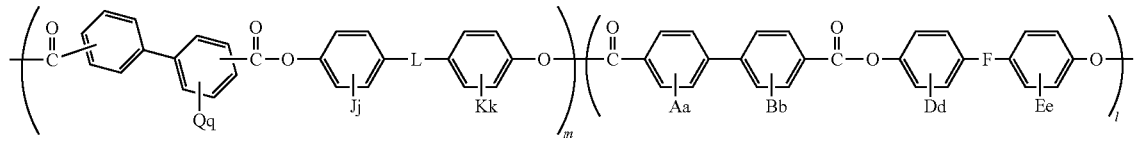
(XIB)

In the chemical formulae (VII), (VIII), (IX), (X), (XI), (VIIB), (VIIIB), (IXB), (XB), and (XIB), A, B, D, E, a, b, d, e, and F are the same as those in the chemical formula (I). In the chemical formulae (VII), (VIII), (IX), (X), and (XI), $R^{100}$ and $R^{200}$ are each a hydrogen atom or a straight or branched alkyl group with a carbon number of 1 to 10, and are identical to or different from each other. In the chemical formulae (VII) and (VIIB), n is an integer of 2 or more. In the chemical formulae (VIII), (IX), (X), (XI), (VIIIB), (IXB), (XB), and (XIB), J, K, j, k, L, l, and m are the same as those in the chemical formula (I), and Q and q are the same as those in the chemical formulae (III), (IV), (V), and (VI).

It is yet more preferable that the polymer having repeating units represented by the chemical formula (I) is at least one selected from the group consisting of: a polymer having repeating units represented by the following chemical formula (XII); a polymer having repeating units represented by the following chemical formula (XIII); a polymer having repeating units represented by the following chemical formula (XIV); a polymer having repeating units represented by the following chemical formula (XV); a polymer having repeating units represented by the following chemical formula (XVI); a polymer having repeating units represented by the following chemical formula (XIIB); a polymer having repeating units represented by the following chemical formula (XIIIB); a polymer having repeating units represented by the following chemical formula (XIVB); a polymer having repeating units represented by the following chemical formula (XVB); a polymer having repeating units represented by the following chemical formula (XVIB); and stereoisomers thereof.

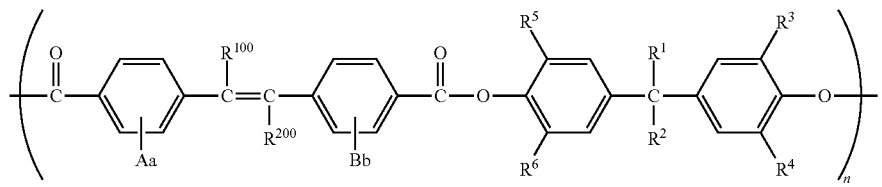
(XII)

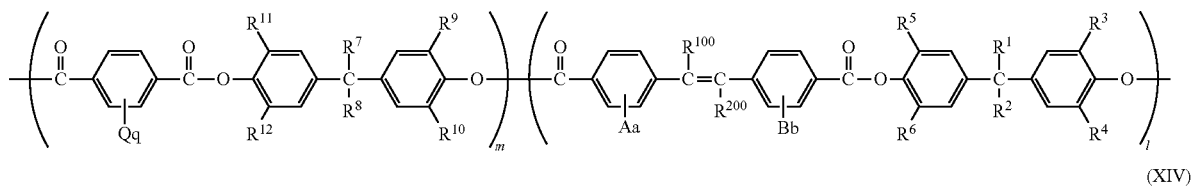
(XIII)

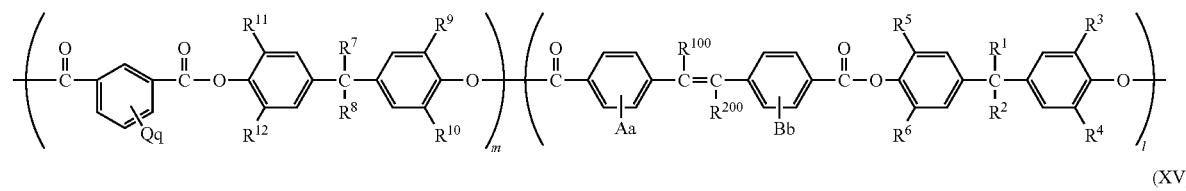
(XIV)

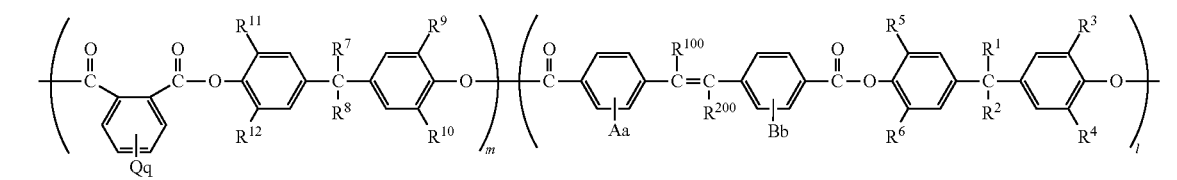
(XV)

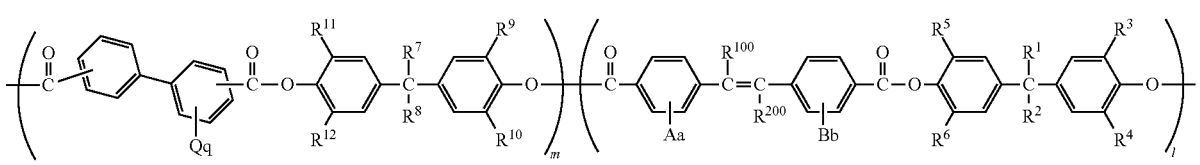
(XVI)

-continued

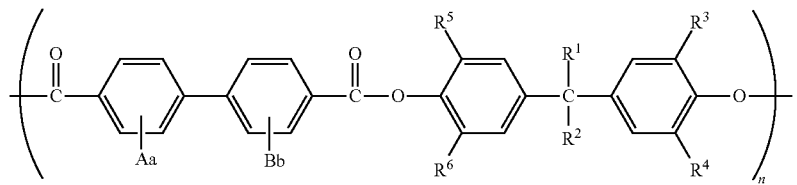
(XIIB)

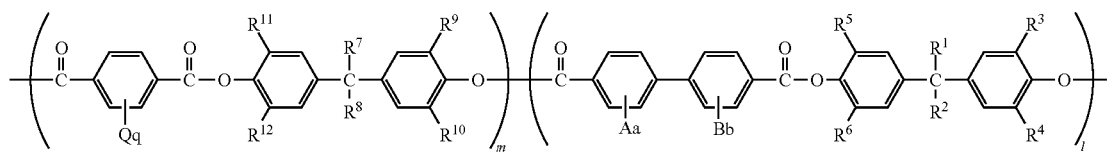
(XIIIB)

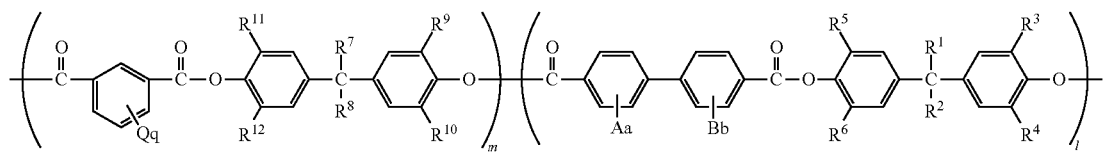
(XIVB)

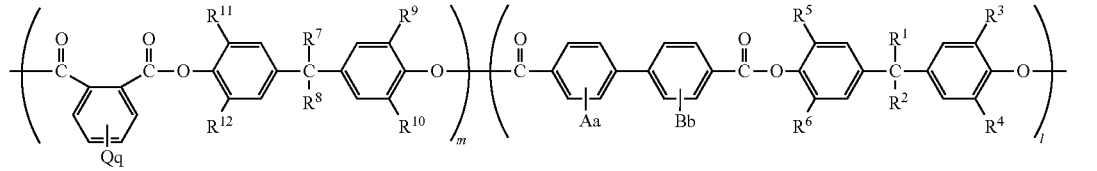
(XVB)

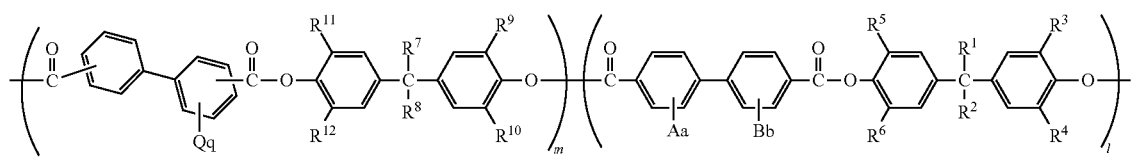
(XVIB)

In the chemical formulae (XII), (XIII), (XIV), (XV), (XVI), (XIIB), (XIIIB), (XIVB), (XVB), and (XVIB), A, B, a, and b are the same as those in the chemical formula (I), $R^1$ and $R^2$ are each a hydrogen atom, a straight or branched alkyl group with a carbon number of 1 to 10, or a substituted or unsubstituted aryl group, and are identical to or different from each other, and $R^3$ to $R^6$ are each a hydrogen atom, a halogen atom, a straight or branched alkyl group with a carbon number of 1 to 6, or a substituted or unsubstituted aryl group, and are identical to of different from each other. In the chemical formula (XII), (XIII), (XIV), (XV), and (XVI), $R^{100}$ and $R^{200}$ are each a hydrogen atom or a straight or branched alkyl group with a carbon number of 1 to 10, and are identical to or different from each other. In the chemical formulae (XII) and (XIIB), n is an integer of 2 or more. In the chemical formulae (XIII), (XIV), (XV), (XVI), (XIIIB), (XIVB), (XVB), and (XVIB), l and m is the same as those in the chemical formula (I), Q and q are the same as those in the chemical formulae (III) to (VI), $R^7$ and $R^8$ are each a hydrogen atom, a straight or branched alkyl group with a carbon number of 1 to 10, or substituted or unsubstituted aryl group, and are identical to or different form each other, and $R^9$ to $R^{12}$ are each a hydrogen atom, a halogen atom, a straight or branched alkyl group with a carbon number of 1 to 6, or a substituted or unsubstituted aryl group, and are identical to or different from each other.

In the chemical formulae (XII), (XIII), (XIV), (XV), (XVI), (XIIB), (XIIIB), (XIVB), (XVB), and (XVIB), it is more preferable that $R^2$ is a straight or branched alkyl group with a carbon number of 2 to 10, and at least one of $R^3$ to $R^6$ is not a hydrogen atom. In the chemical formulae (XIII), (XIV), (XV), (XVI), (XIIIB), (XIVB), (XVB), and (XVIB), it is more preferable that $R^8$ is a straight or branched alkyl group with a carbon number of 2 to 10, and at least one of $R^9$ to $R^{12}$ is not a hydrogen atom.

In the chemical formulae (XII), (XIII), (XIV), (XV), (XVI), (XIIB), (XIIIB), (XIVB), (XVB), and (XVIB), it is still more preferable that $R^1$ is a methyl group, $R^2$ is a straight or branched alkyl group with a carbon number of 2 to 4. In the chemical formulae (XIII), (XIV), (XV), (XVI), (XIIIB), (XIVB), (XVB), and (XVIB), it is still more preferable that $R^7$ is a methyl group, and $R^8$ is a straight or branched alkyl group with a carbon number of 2 to 4.

In the chemical formulae (XII), (XIII), (XIV), (XV), (XVI), (XIIB), (XIIIB), (XIVB), (XVB), and (XVIB), it is yet more preferable that $R^3$ and $R^5$ are each a straight or branched alkyl group with a carbon number of 1 to 4, and $R^4$ and $R^6$ are each a hydrogen atom or a straight or branched alkyl group with a carbon number of 1 to 4. In this case, $R^3$ and $R^5$ are identical to or different from each other, and $R^4$ and $R^6$ are identical to or different from each other. In the chemical formulae (XIII), (XIV), (XV), (XVI), (XIIIB), (XIVB), (XVB), and (XVIB), it is yet more preferable that $R^9$ and $R^{11}$ are each a straight or branched alkyl group with a carbon number of 1 to 4, $R^{10}$ and $R^{12}$ are each a hydrogen atom or a straight or branched alkyl group with a carbon number of 1 to 4. In this case, $R^9$ and $R^{11}$ are identical to or different from each other, and $R^{10}$ and $R^{12}$ are identical to or different from each other.

In the chemical formulae (XII), (XIII), (XIV), (XV), (XVI), (XIIB), (XIIIB), (XIVB), (XVB), and (XVIB), it is even more preferable that $R^3$ to $R^6$ are each a straight or branched alkyl group with a carbon number of 1 to 4. In this case, $R^3$ to $R^6$ are identical to or different from one another. In the chemical formulae (XIII), (XIV), (XV), (XVI), (XIIIB), (XIVB), (XVB), and (XVIB), it is even more preferable that $R^9$ to $R^{12}$ are each a straight or branched alkyl group with a carbon number of 1 to 4. In this case, $R^9$ to $R^{12}$ are identical to or different from one another.

In the chemical formula (IA), it is preferable that X is a halogen atom, a straight or branched alkyl group with a carbon number of 1 to 6, a straight or branched halogenated alkyl group with a carbon number of 1 to 6, a straight or branched alkoxy group with a carbon number of 1 to 6, or a straight or branched halogenated alkoxy group with a carbon number of 1 to 6. Further, it is preferable that X' is a halogen atom, a straight or branched alkyl group with a carbon number of 1 to 6, a straight or branched halogenated alkyl group with a carbon number of 1 to 6, a straight or branched alkoxy group with a carbon number of 1 to 6, or a straight or branched halogenated alkoxy group with a carbon number of 1 to 6. In each of X and X', the halogen atom particularly preferably is a fluorine atom. The straight or branched alkyl group with a carbon number of 1 to 6 is more preferably a straight or branched alkyl group with a carbon number of 1 to 4, still more preferably a methyl group, an ethyl group, a propyl group, an isopropyl group, a butyl group, an isobutyl group, a sec-butyl group, or a tert-butyl group, and particularly preferably a methyl group or an ethyl group. The straight or branched halogenated alkyl group with a carbon number of 1 to 6 is more preferably a straight or branched halogenated alkyl group with a carbon number of 1 to 4, and particularly preferably a trifluoromethyl group. The straight or branched alkoxy group with a carbon number of 1 to 6 is more preferably a straight or branched alkoxy group with a carbon number of 1 to 4, still more preferably a methoxy group, an ethoxy group, a propoxy group, an isopropoxy group, a butoxy group, an isobutoxy group, a sec-butoxy group, or a tert-butoxy group, and particularly preferably a methoxy group or an ethoxy group. The straight or brunched halogenated alkoxy group with a carbon number of 1 to 6 is more preferably a straight or brunched halogenated alkoxy group with a carbon number of 1 to 4, and particularly preferably a trifluoromethoxy group.

The polymer having repeating units represented by the chemical formula (IA) preferably is a polymer having repeating units represented by the following chemical formula (IIIA).

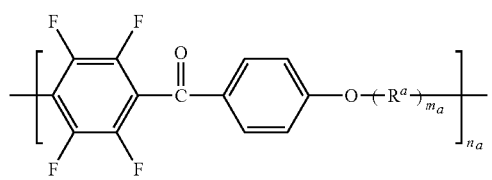
(IIIA)

In the chemical formula (IIIA), $R^a$, $m_a$, and $n_a$ are the same as those in the chemical formula (IA).

In the chemical formula (IIA), it is preferable that $R^b$ is at least one selected from the group consisting of o-, m-, and p-phenylene groups, and divalent groups derived from naphthalene, biphenyl, anthracene, o-, m-, and p-terphenyl, phenanthrene, dibenzofuran, biphenyl ether and biphenyl sulfone, respectively. In these divalent aromatic groups, hydrogen directly binding to aromatic is optionally substituted with a halogen atom, a straight or branched alkyl group with carbon number of 1 to 6, or a straight or branched alkoxy group with a carbon number of 1 to 6. It is more preferable that $R^b$ is at least one aromatic group selected from the group consisting of groups represented by the following chemical formulae (IVA), (VA), (VIA), (VIIA), (VIIIA), (IXA), and (XA), respectively.

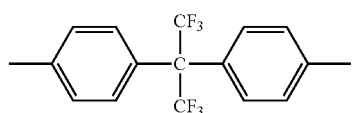
(IVA)

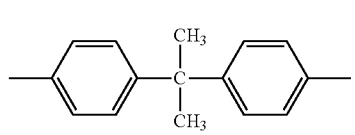
(VA)

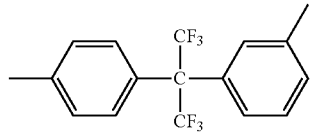
(VIA)

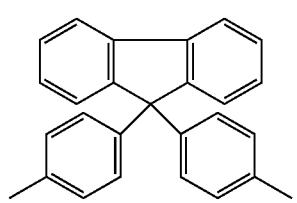
(VIIA)

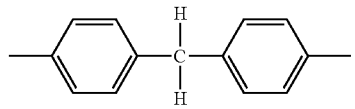
(VIIIA)

(IXA)

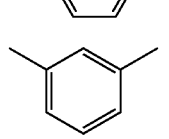
(XA)

The chemical formula (IIA) (i.e., $R^a$ in the chemical formula (IA)) preferably is a group represented by the following chemical formula (XIA).

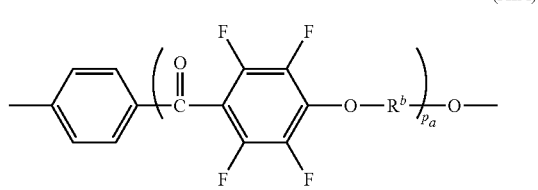
(XIA)

In the chemical formula (XIA), $R^b$ and $p_a$ are the same as those in the chemical formula (IIA).

In the polymer represented by the chemical formula (IA), it is preferable that the end on a p-tetrafluorobenzoylene group side is fluorine, and the end on an oxyalkylene group side is a hydrogen atom. Such polymer can be represented by the following formula (XIIA). In the chemical formula (XIIA), X, q, $R^a$, $m_a$, and $n_a$ are the same as those in the chemical formula (IA).

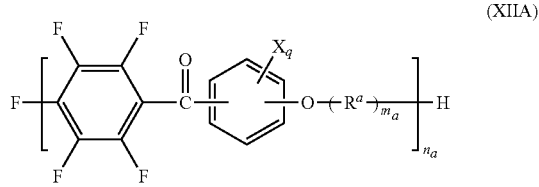

(XIIA)

In the liquid crystal panel of the present invention, the polymer represented by the chemical formula (I) preferably is a non-halogenated polymer having a polymer structure that has no halogen atom. Also, the polymer represented by the chemical formula (I) preferably is a polymer that is soluble in at least one of toluene and ethyl acetate. Similarly, the polymer represented by the chemical formula (IA) preferably is a non-halogenated polymer having a polymer structure that has no halogen atom. Also, the polymer represented by the chemical formula (IA) preferably is a polymer that is soluble in at least one of toluene and ethyl acetate.

The present invention is described in more detail below.
(Definitions of Terms and Signs)

Definitions of terms and signs in the present description are as follows.

The Nz coefficient is a ratio between an in-plane retardation Re and a retardation Rth in the thickness direction and is expressed by the following mathematical formula (7).

$$Nz=(nx-nz)/(nx-ny) \quad (7)$$

The definitions of nx, ny, nz are the same as those mentioned in the mathematical formulae (1), (2), (3), and (4). Re and Rth are calculated according to the mathematical formula (5) or (6) based on the measured values of nx, ny, and nz. Further, "nx=ny" not only means that they are completely the same, but also encompasses the case where they are substantially the same. "nx and ny are substantially the same" means that nx and ny are different from each other to the extent that the difference does not practically influence on properties of the optical compensation layer. In this case, the absolute value of the difference between nx and ny is not particularly limited, and is, for example, 0.0005 or less, preferably 0.0001 or less. The same definition as that of "nx=ny" applies to those of "nx=nz" and "ny=nz".

[1. Liquid Crystal Panel]

An example of the configuration of the liquid crystal panel of the present invention is shown in the sectional view of FIG. 1. As shown in FIG. 1, this liquid crystal panel 100 is configured so that a first polarizer 30, a first optical compensation layer 60, a liquid crystal cell 40, a second optical compensation layer 70, a second polarizer 50 are laminated in this order. The first optical compensation layer 60 satisfies the mathematical formulae (1) and (2). The second optical compensation layer 70 satisfies the mathematical formulae (3) and (4). The first optical compensation layer and the second optical compensation layer are described in detail below.

Preferably, an absorption axis of the first polarizer 30 and an absorption axis of the second polarizer 50 are substantially orthogonal to each other.

The liquid crystal cell 40 includes a pair of glass substrates 41 and 42 and a liquid crystal layer 43 that is used as an image medium arranged between these substrates 41 and 42. A gap (a cell gap) between the substrates 41 and 42 is controlled by spacers 44 arranged between theses substrates 41 and 42. The substrate 41 may be an active matrix substrate. For example, the substrate 41 is provided with a switching element (typically, TFT) for controlling the electro-optical characteristics of the liquid crystal and a scanning line for supplying gate signals to this switching element and a signal line for supplying source signals to the same (all are not shown). The glass substrate 42 may be a color filter substrate provided with a color filter (not shown). The active matrix substrate 41 may be provided with a color filter. For example, alignment films (not shown) composed of polyimide are provided on the side of the substrate 41 to which the liquid crystal layer 43 contacts and the side of the substrate 42 to which the liquid crystal layer 43 contacts.

The driving mode of the liquid crystal cell 40 is not particularly limited, and examples thereof include STN (Super Twisted Nematic) mode, TN (Twisted Nematic) mode, IPS (In-Plane Switching) mode, VA (Vertical Aligned) mode, OCB (Optically Compensated Birefringence) mode, HAN (Hybrid Aligned Nematic) mode, and ASM (Axially Symmetric Aligned Microcell). Among them, VA mode and OCB mode are preferable as mentioned above for the reason that an improvement in color shift is particularly significant.

In the liquid crystal panel of the present invention, the optical compensation layers, the polarizers, and the liquid crystal cell can be laminated via any appropriate pressure sensitive adhesive layer or an adhesive layer. The structure of the liquid crystal panel of the present invention is not limited by the above description. For example, the liquid crystal cell is not limited to the configuration of FIG. 1, and any liquid crystal cell may be used. Although not shown in FIG. 1, protective layers may be laminated on one side of the first polarizer and one side of the second polarizer, respectively. The liquid crystal panel of the present invention may optionally includes other components beside the first polarizer, the first optical compensation layer, the liquid crystal cell, the second optical compensation layer, and the second polarizer. Examples of the other components include other optical elements (for example, retardation plates), protective layers of the polarizers, and the pressure-sensitive adhesive or an adhesive. The first polarizer and the first optical compensation layer may be arranged on any side of the liquid crystal cell, and the second polarizer and the second optical compensation layer may be arranged on any side of the liquid crystal cell. It is preferable that the first polarizer and the first optical compensation layer are arranged on the visible side of the liquid crystal cell, and the second polarizer and the second optical compensation layer are arranged on the side opposite to the visible side of the liquid crystal cell.

Components of the liquid crystal panel of the present invention are described in more detail below.

[1-1. Polarizer]

As the first polarizer and the second polarizer, any appropriate polarizers can be used according to the purpose of using the polarizers. Properties such as formation materials and thicknesses of the first polarizer and the second polarizer may be identical to or different from each other. Specific examples of the first polarizer and the second polarizer include those each obtained by causing a dichromatic substance such as iodine or a dichroic dye to be absorbed in a hydrophilic polymer film such as a polyvinyl alcohol film, a partially formalized polyvinyl alcohol film, or a partially saponified ethylene-vinyl acetate copolymer film and subjecting the resultant film to uniaxial stretching; polyene aligned films such as a dehydration product of polyvinyl alcohol and a dehydrochlorination product of polyvinyl chloride. Among them, a polarizer obtained by causing a dichromatic substance such as iodine to be absorbed in a polyvinyl alcohol film and subjecting the resultant film to uniaxial stretching is particularly preferable because it has a high polarization dichroic ratio. Thicknesses of these polarizers are not particularly limited, and are, for example, in the range of about 5 to 80 μm.

The polarizer obtained by causing iodine to be absorbed in a polyvinyl alcohol film and subjecting the resultant film to uniaxial stretching can be produced by, for example, dyeing polyvinyl alcohol by immersing it in an iodine aqueous solution, and stretching the resultant polyvinyl alcohol 3 to 7 times the original length. The iodine aqueous solution may contain, for example, boric acid, zinc sulfate, or zinc chloride, if necessary, and also, polyvinyl alcohol can be immersed in, for example, a potassium iodide aqueous solution. Further, a polyvinyl alcohol film may be washed with water by immersing it in water before dyeing it, if necessary. When polyvinyl alcohol is washed with water, a contaminant and an antiblocking agent on the surface of the polyvinyl alcohol film can be removed. Further, an effect of preventing unevenness such as unevenness of dyeing is obtained by expanding the polyvinyl alcohol film. The stretching may be carried out after dyeing the film with iodine, may be carried out while dyeing, or may be carried out before dyeing the film with iodine. The film can be stretched in a boric acid aqueous solution, a potassium iodide aqueous solution or a water bath.

As mentioned above, a protective layer may be laminated on at least one surface of each of these polarizers. In the present invention, it is to be noted that one obtained by laminating a protective layer on at least one surface of a polarizer is referred to as a "polarizing plate". The protective layer is, for example, any appropriate film which can be used as a protective film of the polarizing plate. Examples of the material that is to be a main component of such film include a cellulose resin such as triacetyl cellulose (TAC) and transparent resins such as polyester, polyvinyl alcohol, polycarbonate, polyamide, polyimide, polyethersulfone, polysulfone, polystyrene, polynorbornene, polyolefin, acryl, and acetate. Examples of the material also include thermosetting resins of acryl, urethane, acrylurethane, epoxy, and silicon and ultraviolet curable resins. Besides theses materials, the material can be, for example, a grassy polymer such as siloxane polymer. Further, a polymer film described in JP 2001-343529 A (WO 01/37007) also can be used. As a material of this film, a resin composition containing a thermoplastic resin having a substituted or unsubstituted imide group on the side chain thereof and a thermoplastic resin having a substituted or unsubstituted phenyl group and a nitrile group on the side chain thereof can be used. Such resin composition can be, for example, a resin composition containing an alternating copolymer of isobutene and N-methyl maleimide and an acrylonitrile-styrene copolymer. The above-described polymer film may also be an extrusion-molded product of the above-described resin composition. Particularly preferably, the material for forming a protective layer is TAC, a polyimide resin, polyvinyl alcohol resin, or a glassy polymer. The protective layer on the first polarizer and the protective layer on the second polarizer may be identical to or different from each other.

Preferably, the protective layer is transparent and is not colored. In particular, the retardation in the thickness direction of the protective layer is preferably in the range of −90 to +90 nm, more preferably in the range of −80 to +80 nm, most preferably in the range of −70 to +70 nm.

The thickness of the protective layer is not particularly limited, and is preferably 5 mm or less, more preferably 1 mm or less, particularly preferably in the range of 1 to 500 μm, and most preferably in the range of 5 to 150 μm.

[1-2. First Optical Compensation Layer]

The first optical compensation layer is a birefringence layer satisfying the mathematical formulae (1) and (2). The mathematical formulae (1) and (2) are re-shown below.

$$nx > ny \geq nz \quad (1)$$

$$(Re[450]/Re[550]) < 1.00 \quad (2)$$

The upper limit of Re[450]/Re[550] is preferably 0.99 or less, more preferably 0.95 or less, and still more preferably 0.92 or less. The lower limit of Re[450]/Re[550] is not particularly limited, and is, for example, 0.80 or more, and preferably 0.85 or more.

The first optical compensation layer may be a single layer or a laminate of two or more layers. In the case where the first optical compensation layer is a laminate, properties such as formation materials and thicknesses of the layers can be set as appropriate as long as the entire laminate has optical properties as described above.

An in-plane retardation Ra[590] of the first optical compensation layer at a measurement wavelength of 590 nm and a measurement temperature of 23° C. is preferably in the range of 90 to 160 nm, more preferably in the range of 95 to 150 nm, and still more preferably in the range of 95 to 145 nm.

The thickness of the first optical compensation layer may be set as appropriate with consideration given to the in-plane retardation thereof. The thickness of the first optical compensation layer is preferably in the range of 20 to 110 μm, more preferably in the range of 25 to 105 μm, and most preferably in the range of 30 to 100 μm.

The material for forming the first optical compensation layer is not particularly limited, and examples thereof include a polyvinyl acetal resin, a cyclic olefin resin, a cellulose resin, and a polyester resin. The first optical compensation layer preferably is a polyvinyl acetal film, a cyclic olefin film, or a cellulose film.

The polyvinyl acetal resin is not particularly limited, and as the polyvinyl acetal resin, a resin containing a polymer represented by the following general formula (XVII), which is described in a paragraph [0026] of JP No. 3984277 can be used. The polymer has superior transparency, heat resistance, and processability because it has a naphthyl group in a molecule structure thereof.

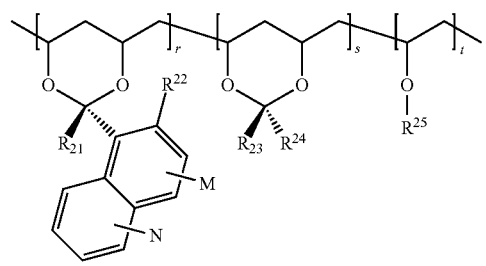

(XVII)

The polymer can be obtained by subjecting at least one of an aldehyde compound and a ketone compound, and a polyvinyl alcohol resin to a condensation reaction. In the polymer represented by the general formula (XVII), the alignment order of the basic units of r, s, and t is not particularly limited, and the polymer may be any of an alternating polymer, a random polymer, and a block polymer. The polymer contains a polymer (a high polymer) having a total of polymerization degrees of basic units of r, s, and t of 20 or more and a high weight average molecular weight and further contains a low polymer (i.e., oligomer) having a total of polymerization degrees of basic units of r, s, and t in the range of 2 to 20 and a weight average molecular weight of about a few thousand.

In the general formula (XVII), $R^{21}$ and $R^{23}$ are each a hydrogen atom, a halogen atom, a straight or branched alkyl group with a carbon number of 1 to 4, or a substituted or unsubstituted phenyl group, and are identical to or different from each other.

In the general formula (XVII), $R^{22}$, M, and N are each a hydrogen atom, a halogen atom, a straight or branched alkyl group with a carbon number of 1 to 4, a straight or branched halogenated alkyl group with a carbon number of 1 to 4, a straight or branched alkoxy group with a carbon number of 1 to 4, an alkoxy carbonyl group, an acyloxy group, an amino group, an azide group, a nitro group, a cyano group, or a hydroxy group, and $R^{22}$, M, and N are identical to or different from each other. It is to be noted that $R^{22}$ is not a hydrogen atom.

In the general formula (XVII), $R^{24}$ is a hydrogen atom, a straight or branched alkyl group with a carbon number of 1 to 4, a substituted or unsubstituted cycloalkyl group with a carbon number of 5 to 10, a substituted or unsubstituted phenyl group, a substituted or unsubstituted naphthyl group, or a substituted or unsubstituted heterocyclic group.

In the general formula (XVII), $R^{25}$ is a hydrogen atom, a straight or branched alkyl group with a carbon number of 1 to 4, a benzyl group, a silyl group, a phosphate group, an acyl group, a benzoyl group, or a sulfonyl group.

The first optical compensation layer is produced by, for example, forming the above-described polyvinyl acetal resin into a sheet by a compression molding method, a transfer molding method, an injection molding method, an extrusion molding method, a blow molding method, a powder molding method, a FRP molding method, or a solvent casting method, and stretching the polymer (the polyvinyl acetal film) formed into a sheet with appropriately selecting, for example, stretching conditions (for example, a stretching temperature, a stretching ratio, and a direction in which the film is stretched) and a stretching method.

The cyclic olefin resin is a genetic name of resins obtained by polymerizing a cyclic olefin used as a polymerization unit, and examples thereof include resins described in, for example, JP 1-240517 A, JP 3-14882 A, and JP 3-122137 A. Specific examples thereof include a ring-opening (co)polymer of cyclic olefin, an addition polymer of the same, a copolymer (typically, a random copolymer) of cyclic olefin and α-olefin such as ethylene or propylene, and graft modified products obtained by modifying these polymers with unsaturated carboxylic acid or a derivative of the unsaturated carboxylic acid, and hydrides of the graft modified products. Specific examples of the cyclic olefin include norbornene monomers.

In the present invention, other cyclo olefin can be used in a combination with the cyclic olefin resin in the range where the purpose of the present invention is not obstructed. The cyclo olefin can be, for example, a compound having one reactive double bond, such as cyclopentene, cyclooctene, or 5,6-dihydrodicyclopentadiene.

The cyclic olefin resin has the number average molecular weight (Mn) measured by a gel permeation chromatography (GPC) method using a toluene solvent preferably in the range of 25,000 to 200,000, more preferably in the range of 30,000 to 100,000, and most preferably in the range of 40,000 to 80,000. With the number average molecular weight in the above-described range, a cyclic olefin resin with superior mechanical strength, and favorable solubility, moldability, and operability of flow expanding can be produced.

In the case where the cyclic olefin resin is obtained by hydrogenating a ring-opening polymer of norbornene monomer, the hydrogenation ratio is preferably 90% or more, more preferably 95% or more, and most preferably 99% or more. With the hydrogenation ratio in the above-described range, the cyclic olefin resin has superior thermal degradation resistance and light degradation resistance, for example.

The first optical compensation layer is obtained by, for example, stretching the film (the cyclic olefin film) formed of the cyclic olefin resin. As a method for forming the cyclic olefin film, any suitable molding method can be employed. Specific examples of the method include a compression molding method, a transfer molding method, an injection molding method, an extrusion molding method, a blow molding method, a powder molding method, a FRP molding method, and a cast molding (casting) method. Among these methods, an extrusion molding method or a cast molding (casting) method is preferable from the viewpoint of improving smoothness of the film to be obtained, and obtaining favorable optical uniformity. The molding conditions can be set as appropriate according to, for example, the composition and the type of the resin to be used and the desired properties of the first optical compensation layer. As the cyclic olefin film, many film products are commercially available, and thus, the commercially available film as it is may be stretch-treated.

The cyclic olefin film may be a film obtained by free-end stretching or may be a film obtained by fixed-end stretching. Preferably, the cyclic olefin film is the film obtained by fixed-end stretching. By fixed-end stretching a film, the film can easily satisfy a relationship nx>ny≧nz. Further, by fixed-end stretching a film, a slow axis can be provided in the short-side direction (the width direction). Thus, when the slow axis of the film is arranged so as to be orthogonal to an absorption axis of a polarizer, the film and the polarizer can be attached to each other by carrying out a roll-to-roll process continuously. Thus, production efficiency of liquid crystal panel is increased.

As the cellulose resin, any appropriate cellulose resin (typically, ester of cellulose and acid) can be employed.

It is preferable that the cellulose resin is substituted with an acetyl group and a propionyl group. The lower limit of the substitution degree of this cellulose resin, "DSac (acetyl substitution degree)+DSpr (propionyl substitution degree)" (that expresses how many hydroxyl groups among three hydroxyl groups in a repeating unit of cellulose are substituted with an acetyl group or a propionyl group on average), is preferably 2 or more, more preferably 2.3 or more, and still more preferably 2.6 or more. The upper limit of "DSac+DSpr" is preferably 3 or less, more preferably 2.9 or less, and still more preferably 2.8 or less. Setting the substitution degree of the cellulose resin in the above-described range is preferable from the viewpoint of refractive index distribution of the first optical compensation layer.

The lower limit of DSpr (propionyl substitution degree) is preferably 1 or more, more preferably 2 or more, and still more preferably 2.5 or more. The upper limit of DSpr is preferably 3 or less, more preferably 2.9 or less, and still more preferably 2.8 or less.

DSac (acetyl substitution degree) and DSpr (propionyl substitution degree) can be determined based on the measurement value obtained by $^1$HNMR, as described in paragraphs [0016] to [0019] in JP 2003-315538 A.

The cellulose resin may have other substituents besides an acetyl group and a propionyl group. Examples of the other substituents include an ester group such as butyrate; and ether groups such as an alkyl ether group and an aralkylene ether group.

The number average molecular weight of the cellulose resin is preferably in the range of 5,000 to 100,000, more preferably in the range of 10,000 to 70,000. With the number average molecular weight in the above-described range, the cellulose resin has superior productivity and easily obtains favorable mechanical strength.

As a method for introducing an acetyl group and a propionyl group into the cellulose resin, any suitable method may be used. For example, alkali cellulose is obtained by treating cellulose with a strong caustic soda solution, and the alkali cellulose is acylated with a predetermined amount of mixture of acetic anhydride and propionic anhydride. Then, the substitution degree "DSac+DSpr" is adjusted by hydrolyzing the acyl group partially.

The cellulose film may contain any appropriate polymer material. Examples of the polymer material include cellulose ester such as cellulose butyrate; and cellulose ethers such as methyl cellulose and ethyl cellulose. The cellulose film may contain additives such as a plasticizer, a thermostabilizer, and an ultraviolet light stabilizer, if necessary.

The first optical compensation layer may be obtained by, for example, stretching a film (a cellulose film) formed of the above-described cellulose resin. As a method for forming a film of cellulose resin, any suitable molding method can be employed. Specific examples of the method include a compression molding method, a transfer molding method, an injection molding method, an extrusion molding method, a blow molding method, a powder molding method, a FRP molding method, and a cast molding (casting) method. Among these method, an extrusion molding method or a cast molding (casting) method is particularly preferable from the viewpoint of improving smoothness of the film to be obtained, and obtaining favorable optical uniformity. The molding conditions can be set as appropriate according to the composition and type of the resin to be used and desired properties of the first optical compensation layer. As the cellulose film, many film products are commercially available, and thus, the commercially available film as it is may be stretch-treated.

The polyester resin is not particularly limited, and any appropriate polyester resin can be used. Preferably, as the polyester resin, a polyester resin having a non-aromatic cyclic structure and an ester group, which is obtained by polymerizing a dicarboxylic acid component having a non-aromatic cyclic structure and a diol component is used. The dicarboxylic acid component can be, for example, 1,4-cyclohexane dicarboxylic acid. For the dicarboxylic acid component, one type can be used independently, or two types or more can be used in combination. Examples of the diol component include 9,9-bis[4-(2-hydroxyethoxy)phenyl]fluorene and 1,4-cyclohexane dimethanol. For the diol component, one type can be used independently, or two types or more can be used in combination.

The intrinsic viscosity of the polyester resin preferably is in the range of 0.2 to 0.6 dL/g. The glass transition temperature (Tg) of the polyester resin preferably is in the range of 110° C. to 150° C. With the above-described resin, a retardation film with further superior thermostability and stretchability can be obtained. The intrinsic viscosity can be, for example, measured by the method described in the examples below. The glass transition temperature (Tg) is, for example, calculated by a DSC method according to JIS K 7192.

The first optical compensation layer is produced by, for example, stretching a polymer film (a polyester film) obtained by forming the polyester resin into a sheet with appropriately selecting, for example, stretching conditions (for example, a stretching temperature, a stretching ratio, and a direction in which the film is stretched) and a stretching method.

[1-3. Second Optical Compensation Layer]

The second optical compensation layer is a birefringence layer satisfying the mathematical formulae (3) and (4). The mathematical formulae (3) and (4) are re-shown below.

$$nx \geq ny > nz \quad (3)$$

$$(Rth[450]/Rth[550]) \geq 1.10 \quad (4)$$

The inventors of the present invention found out that the second optical compensation layer having a wavelength dispersion satisfying (Rth[450]/Rth[550])≥1.10 that is precipitous and the first optical compensation layer are used in the above-mentioned configuration, and arrived at the liquid crystal panel of the present invention. Thus, the liquid crystal panel of the present invention has an extremely small change in color, depending on a viewing direction, and is sufficiently applicable to, for example, a liquid crystal display including a thin liquid crystal cell and a large-screen liquid crystal display. The lower limit of Rth[450]/Rth[550] of the second optical compensation layer preferably is 1.15 or more. The second optical compensation layer may be a single layer or a laminate of two or more layers. In the case where the second optical compensation layer is a laminate, properties such as formation materials and thicknesses of the layers can be set as appropriate as long as the entire laminate has optical properties as described above.

In the case where the second optical compensation layer has the relationship satisfying nx=ny>nz, it may function as a negative C plate. Further, the second optical compensation layer may have the relationship satisfying nx>ny>nz. When the second optical compensation layer has such refractive index distribution, the purpose of the present invention can be effectively achieved by combining the second optical compensation layer with the specific first optical compensation layer. In the present invention, "nx=ny" not only means that they are completely the same, but also encompasses the case where they are substantially the same, as described above. The in-plane retardation Δnd, with which the second optical compensation layer is practically acceptable as a negative C plate is preferably in the range of 0 to 20 nm, more preferably in the range of 0 to 10 nm, and still more preferably in the range of 0 to 5 nm.

The retardation Rth in the thickness direction of the second optical compensation layer is preferably in the range of 30 to 350 nm, more preferably in the range of 60 to 300 nm, still more preferably in the range of 80 to 260 nm, and most preferably in the range of 100 to 240 nm.

The thickness of the second optical compensation layer, with which the above-described retardation in the thickness direction can be obtained may vary according to, for example, the materials to be used. The thickness of the second optical compensation layer is, for example, in the range of 1 to 50 µm, preferably in the range of 1 to 20 µm, more preferably in the range of 1 to 15 µm, still more preferably in the range of 1 to 10 μm, particularly preferably in the range of 1 to 8 μmm, and most preferably in the range of 1 to 5 μm. The thickness of the second optical compensation layer is not limited to the above-mentioned thickness, and may be, for example, 60 μm or more. However, the extremely thin second optical compensation layer such as mentioned above may significantly contribute to reduce the thickness of image display. Further, in the case where the second optical compensation layer is formed to be extremely thin, heat unevenness is significantly prevented.

[1-3-1. Material for Forming Second Optical Compensation Layer and the Like]

As the material for forming the second optical compensation layer, any suitable material can be employed as long as the second optical compensation layer can obtain optical properties satisfying the mathematical formulae (3) and (4). The second optical compensation layer preferably is a layer (hereinafter referred to as "coated layer") obtained by coating a non-liquid crystalline material from the viewpoint of forming a extremely thin second optical compensation layer such as mentioned above. The non-liquid crystalline material preferably is a non-liquid crystalline polymer. In the case where such non-liquid crystalline material is used to form a coated layer, it is also possible to form a film exerting uniaxiality such as nx>nz or ny>nz by properties of the film itself regardless of alignment of a substrate. Thus, not only an aligned substrate but also a non-aligned substrate can be used. Further, in also the case of using a non-aligned substrate, for example, the steps of applying an aligned film on the surface of the substrate and the steps of laminating the aligned film can be abbreviated.

The non-liquid crystalline polymer is not particularly limited, and is, as mentioned above, preferably at least one selected from the group consisting of a polymer having repeating units represented by the chemical formula (I), the polymer having repeating units represented by the chemical formula (IA), and stereoisomers thereof. More preferable structures of the polymer having repeating units represented by the chemical formula (I) are shown in the chemical formulae (II) to (XVI) and (VIIB) to (XVIB). The substituents also are the same as those mentioned above. Each of the polymers having repeating units represented by the chemical formulae (I) to (XVI) and (VIIB) to (XVIB), respectively, has an ester bond in the backbone thereof, and thus, it can be said that the each polymer is a kind of polyester. More preferable structures of the polymer having repeating units represented by the chemical formula (IA) also are the same as those mentioned above. The polymer having repeating units represented by the chemical formula (IA) is a kind of aryl ether ketone.

Polyesters represented by the chemical formulae (I) to (XVI) and (VIIB) to (XVIB), respectively, are easily dissolved in a relatively low polarity solvent (for example, toluene and ethyl acetate) and thus have superior productivity of the second optical compensation layer. The same applies to the poly aryl ether ketone represented by the chemical formula (IA). By the use of polyester represented by each of the chemical formula (I) to (XVI) or (VIIB) to (XVIB) or poly aryl ether ketone represented by the chemical formula (IA), the second optical compensation layer can realize to have precipitous wavelength dispersion properties, and has superior transparency. The reason why the second optical compensation layer can have the precipitous wavelength dispersion properties is not always clear, but is considered that a ring conjugated system in a polymer main chain is expanded, and thus, aromaticity is improved. By the use of polyester represented by each of the chemical formulae (I) to (XVI) or (VIIB) to (XVIB) or poly aryl ether ketone represented by the chemical formula (IA), the second optical compensation layer can have precipitous wavelength dispersion properties satisfying (Rth[450]/Rth[550])≈1.16, for example. It is to be noted that the value of 1.16 is merely an example, and the present invention is not limited to this.

Further, by the use of polyester represented by each of the chemical formulae (I) to (XVI) or (VIIB) to (XVIB) or poly aryl ether ketone represented by the chemical formula (IA), the birefringence Rth (=nx−nz) itself in the thickness direction of the second optical compensation layer can be increased, and the second optical compensation layer can have favorable optical properties. Generally, it is difficult to obtain both of high solubility to a low polarity solvent and a high birefringence in the thickness direction. However, by the use of polyester represented by each of the chemical formulae (I) to (XVI) or (VIIB) to (XVIB) or poly aryl ether ketone represented by the chemical formula (IA), it is also possible to obtain both of high solubility to a low polarity solvent and a high birefringence in the thickness direction. In particular, in each of the chemical formulae (VII) to (XVI), a stilbene backbone is introduced into a polymer backbone, and in each of the chemical formulae (XII) to (XVI) and (VIIB) to (XVIB), $R^2$ and $R^8$ are set to the above-mentioned specific substituents. Thus, it becomes easy to obtain both of high solubility to a low polarity solvent and a high birefringence in the thickness direction. As $R^2$ and $R^8$, straight or brunched alkyl groups with a carbon number of 2 to 10 are preferable. The reason of this is not always clear, but is considered as the followings (i) and (ii), for example.

(i) The stilbene backbone can enhance solubility by appropriately bending a polymer chain, and since the stilbene backbone has many π electrons, a birefringence Rth in the thickness direction can be increased by enhancing the interaction between aromatic rings (ii) The specific substituents introduced into $R^2$ and $R^8$ cause two benzene rings that is adjacent to each of the substituents to change in shape according to the size of each of the substituents, and thus, solubility can be enhanced. Further, the specific substituents maintain linearity of the polymer structure, and thus a reduction in birefringence Rth in the thickness direction can be suppressed.

In the chemical formulae (I), (II), (III), (IV), (V), and (VI), in the case where the atomic group G is a vinylene group or a derivative thereof, G forms a stilbene backbone with both the benzene rings that are adjacent to G. However, the atomic group G may be any atomic group which is capable of n-conjugating to both the benzene rings that are adjacent to G from the viewpoint of enhancing the interaction between both the benzene rings. Further, G may be a single bond as substitute for an atomic group.

The birefringence nz in the thickness direction of the second optical compensation layer at the wavelength of 550 nm is preferably 0.02 or more, more preferably in the range f 0.02 to 0.08. With such high birefringence nz in the thickness direction, it becomes possible to produce a thinner optical compensation layer with a desired retardation value Rth (nz× thickness d of film) in the thickness direction.

In each of the chemical formulae (I), (III), (IV), (V), (VI), (VIII), (IX), (X), (XI), (XIII), (XIV), (XV), (XVI), (VIIIB), (IXB), (XB), (XIB), (XIIIB), (XIVB), (XVB), and (XVIB), l/(l+m) preferably in the range of 0.3 to 0.8. With l/(l+m) in this range, a birefringence film with particularly superior solubility and a high birefringence in the thickness direction can be easily obtained. Each sequence (alignment of the structure in brackets [ ] or parentheses ( ), with the degree of polymerization l and the structure in brackets [ ] or parentheses ( ), with the degree of polymerization m) of polyesters represented by the chemical formulae (I), (III), (IV), (V), (VI), (VIII), (IX), (X), (XI), (XIII), (XIV), (XV), (XVI), (VIIIB), (IXB), (XB), (XIB), (XIIIB), (XIVB), (XVB), and (XVIB), respectively, is not particularly limited. The polyesters may be block copolymers or random copolymers. In the chemical formula (I), in the case where the structure in brackets [ ] or parentheses ( ), with the degree of polymerization l and the structure in brackets [ ] or parentheses ( ), with the degree of polymerization m are identical to each other, the structure becomes a structure represented by the chemical formula (II), (VII), (XII), (VIIB), or (XIIB).

Polyesters represented by the chemical formulae (I) to (XVI) and (VIIB) to (XVIB), respectively, and poly aryl ether ketone represented by the chemical formula (IA) may be stereoisomers (for example, optical isomers, geometric isomers, and rotational isomers) thereof or mixtures of the stereoisomers. For example, in the chemical formulae (VII) to (XVI), $R^{100}$ and $R^{200}$ are described as in the trans-position, and may be in the cis-position or a cis and trans mixture.

In the chemical formulae (VII), (VIII), (IX), (X), (XI), (XII), (XIII), (XIV), (XV), and (XVI), $R^{100}$ and $R^{200}$ particularly preferably are each a hydrogen atom. Further, in the chemical formulae (I) to (XVI), the number of substituents, a, in A and the number of substituents, b, in B particularly preferably are each 0. Furthermore, in the chemical formulae (I), (III), (IV), (V), (VI), (VIII), (IX), (X), (XI), (XIII), (XIV), (XV), (XVI), (VIIIB), (IXB), (XB), (XIB), (XIIIB), (XIVB), (XVB), and (XVIB), the number of substituents, q, in Q particularly preferably is 0.

In the chemical formulae (I) to (XVI), the absorption wavelength derived from the atomic group G (or $—CR^{100}=CR^{200}—$) in the ultraviolet-visible absorption spectrum is preferably in the range of 300 to 380 nm, more preferably in the range of 320 to 370 nm, for the reason that the optical compensation layer that has a precipitous wavelength dispersion and is free from coloring can be easily obtained.

The transmittance of the second optical compensation layer at the wavelength of 400 nm is preferably 90% or more, more preferably 92% or more. In particular, in the chemical formulae (XII), (XIII), (XIV), (XV), (XVI), (XIIB), (XIIIB), (XIVB), (XVB), and (XVIB), by introducing the specific substituents into $R^2$ and $R^8$, the second optical compensation layer can easily obtain a high transmittance. The reason of this is not always clear, but is considered that the specific substituents cause two benzene rings that are adjacent to each of the substituents to change in shape so that the benzene rings are twisted, and thus an excess overlap of the benzene rings can be suppressed.

The degree of polymerization (n or l+m) of each of the polyesters represented by the chemical formulae (I) to (XVI) and (VIIB) to (XVIB), respectively, is not particularly limited, and is, for example, in the range of 2 to 5,000 or in the range of 5 to 500. The weight average molecular weight (Mw) of each of the polyesters represented by the chemical formulae (I) to (XVI) and (VIIB) to (XVIB), respectively, is not particularly limited, and preferably is in the range of 10,000 to 500,000. The glass transition temperature of each of the polyesters represented by the chemical formulae (I) to (XVI) and (VIIB) to (XVIB), respectively, is preferably 100° C. or more from the viewpoint of heat resistance, and preferably 300° C. or less from the viewpoint of moldability and stretchability.

A method for producing each of polyesters represented by the chemical formulae (I) to (XVI) and (VIIB) to (XVIB), respectively, is not particularly limited, and generally, each of the polyesters can be obtained by polycondensating a biphenyl compound and a dicarboxylic acid compound. The polycondensating method is not particularly limited, and is preferably an interfacial polymerization in which a biphenol compound and a dicarboxylic acid compound are reacted to each other in a two-phase system of an alkali aqueous solution and a water-immiscible organic solvent in the presence of a phase-transfer catalyst. By such polymerizing method, a polymer having superior transparency and a large molecular weight can be obtained. The reaction conditions (a reaction solvent, a reaction temperature, and a reaction time) and the like are not particularly limited, and for example, conventionally known methods for polycondensating a polymer may be used as appropriate as reference purposes. Examples of the water-immiscible organic solvent include halogenated solvents such as methylene chloride, chloroform, and carbon tetrachloride; aromatic hydrocarbons such as toluene and xylene; and derivatives of aromatic hydrocarbons such as nitrobenzene and anisole. The reaction temperature of the polycondensation is, for example, in the range of −5° C. to 50° C., preferably in the range of 5° C. to 35° C., and more preferably in the range of 10° C. to 30° C. The reaction time of the polycondensation is, for example, in the range of 10 minutes to 10 hours, preferably in the range of 30 minutes to 5 hours, and more preferably in the range of 1 to 4 hours.

Examples of the biphenol compound include 2,2-bis(3,5-dimethyl-4-hydroxyphenyl)-4-methylpentane, 2,2-bis(3-methyl-4-hydroxyphenyl)propane, 2,2-bis(3,5-dimethyl-4-hydroxyphenyl)propane, and 2,2-bis(3-methyl-4-hydroxyphenyl)butane.

The dicarboxylic acid compound is preferably 4,4'-stilbene dicarboxylic acid chloride. In the case of copolymers represented by the chemical formulae (III), (IV), (V), (VI), (VIII), (IX), (X), (XI), (XIII), (XIV), (XV), and (XVI), respectively, for example, terephthalic acid chloride, isophthalic acid chloride, phthalic acid chloride, and biphenyl dicarboxylic acid chloride can be used in combination.

The phase-transfer catalyst is not particularly limited, and examples thereof include quaternary ammonium salts such as methyl tri n-octyl ammonium chloride and benzyl triethyl ammonium chloride and a quaternary phosphonium salt such as tetraphenylphosphonium chloride. The water-immiscible organic solvent is not particularly limited, and examples thereof include chloroform and dichloromethane.

Polyesters represented by the chemical formulae (I) to (XVI), respectively, particularly preferably are polyester having repeating units represented by the following chemical formulae (XVIII), (XIX), (XX), or (XXIII). In the following chemical formulae (XVIII), (XX), and (XXIII), l and m are the same as those in the chemical formula (I), and in the following formula (XIX), n is an integer of 2 or more. The polyester having repeating units represented by the following chemical formula (XVIII), (XIX), (XX), or (XXIII) may be any of stereoisomers (for example, optical isomers, geometric isomers, and rotational isomers) thereof or a mixture of the stereoisomers. For example, the vinylene structure may be sic-, trans-, or a mixture thereof.

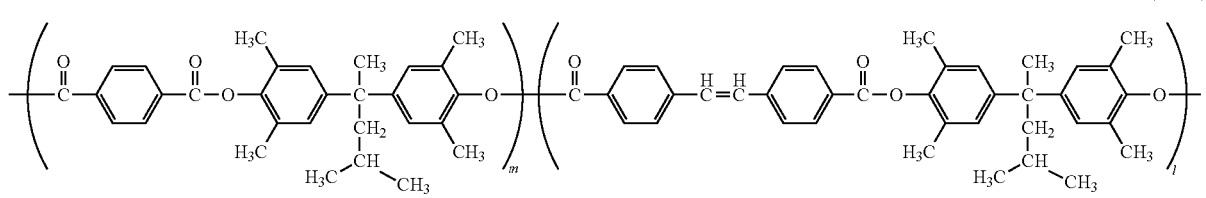

(XVIII)

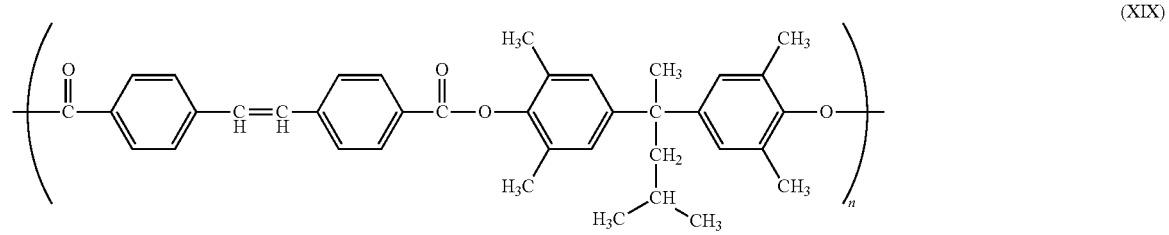

(XIX)

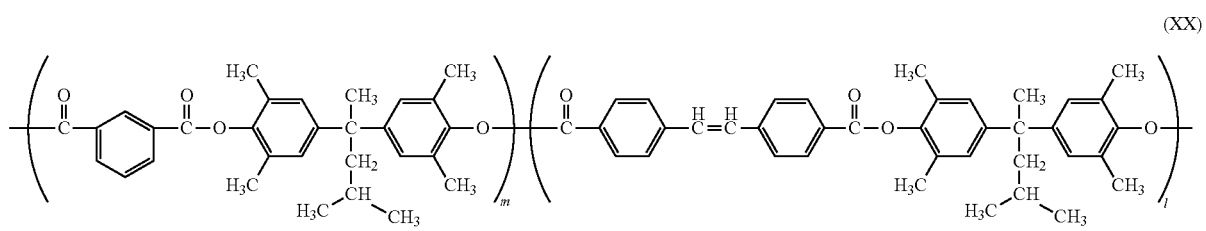

(XX)

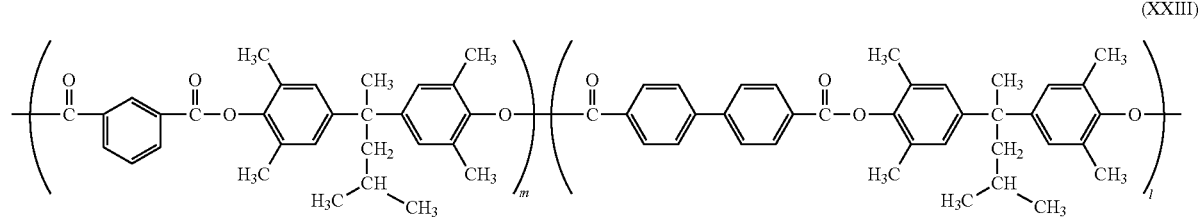

(XXIII)

In poly aryl ether ketone represented by the chemical formula (IA), the degree of polymerization $n_a$ is not particularly limited, and is, for example, in the range of 2 to 5,000 or in the range of 5 to 500. Further, the polymerization of the poly aryl ether ketone may be composed of repeating units having structures that are identical to or different from one another. In latter case, the polymerization of repeating units may be a block polymerization or a random polymerization. The molecular weight of poly aryl ether ketone represented by the chemical formula (IA) is not particularly limited, and the weight average molecular weight of the same is preferably in the range of 1,000 to 1,000,000, more preferably in the range of 2,000 to 500,000. As poly aryl ether ketone represented by the chemical formula (IA), a commercially available product may be used as it is, or the poly aryl ether ketone may be produced by a polymerization reaction, for example. The producing method is not particularly limited, and conventionally known method for producing poly aryl ether ketone may be used for reference purposes.

The poly aryl ether ketone represented by the chemical formula (IA) particularly preferably is poly aryl ether ketone having repeating units represented by the following chemical formula (XIIIA), (XIVA), (XVA), or (XVIA). In the following chemical formula (XIIIA), (XIVA), (XVA), or (XVIA), $n_a$ is the same as that in the chemical formula (IA). The poly aryl ether ketone having repeating units represented by the following chemical formula (XIIIA), (XIVA), (XVA), or (XVIA) may be any of stereoisomers (for example, optical isomers, geometric isomers, and rotational isomers) thereof or a mixture of the stereoisomers.

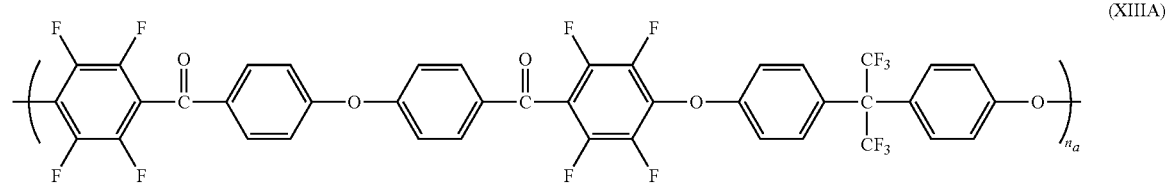

(XIIIA)

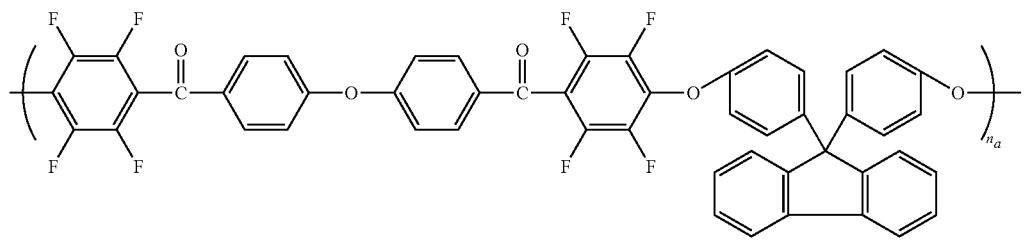

(XIVA)

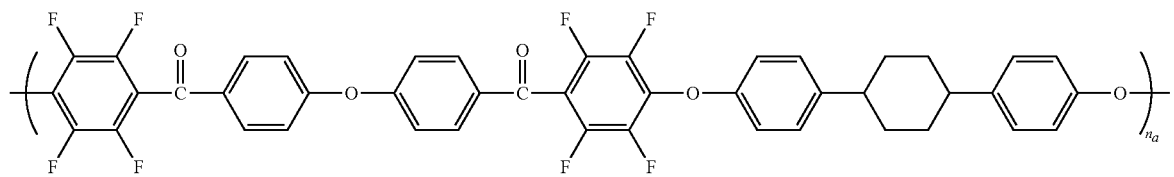

(XVA)

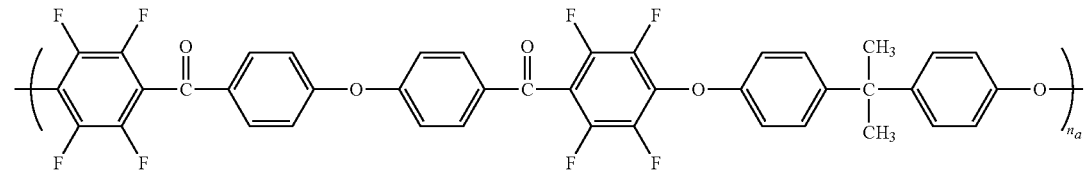

(XVIA)

The material for forming the second optical compensation layer is not particularly limited as mentioned above, and preferably contains one or both of at least one of polyesters represented by the chemical formulae (I) to (XVI) and (VIIB) to (XVIB), respectively, and poly aryl ether ketone represented by the chemical formula (IA). In the case where the second optical compensation layer contains at least one of polyesters represented by the chemical formulae (I) to (XVI) and (VIIB) to (XVIB), respectively, the content of the polyester is not particularly limited. The content is preferably in the range of 50% to 100% by mass, more preferably in the range of 80% to 100% by mass with respect to the total mass of the second optical compensation layer. In the case where the second optical compensation layer contains poly aryl ether ketone represented by the chemical formula (IA), the content of the poly aryl ether ketone is not particularly limited. The content is preferably in the range of 50% to 100% by mass, more preferably in the range of 80% to 100% by mass with respect to the total mass of the second optical compensation layer. In the case where the second optical compensation layer contains both of at least one of polyesters represented by the chemical formulae (I) to (XVI) and (VIIB) to (XVIB), respectively, and poly aryl ether ketone represented by the chemical formula (IA), the total content of the polyester and the poly aryl ether ketone is not particularly limited. The total content is preferably in the range of 50% to 100% by mass, more preferably in the range 80% to 100% by mass with respect to the total mass of the second optical compensation layer. Further, the material for forming a second optical compensation layer may further contains other polymer (for example, polyimide, poly ether ketone, poly amide imide, or polystyrene) besides one or both of at least one of polyesters represented by the chemical formulae (I) to (XVI) and (VIIB) to (XVIB), respectively, and poly aryl ether ketone represented by the chemical formula (IA). The other polymer (resin) is described in more detail below. The second optical compensation layer may or may not contain any additives such as UV absorbers, antistatic agents, and antioxidants.

[1-3-2. Method for Producing Second Optical Compensation Layer]

The method for producing a second optical compensation layer is not particularly limited, and the second optical compensation layer can be produced by any method such as a solution flow-expanding method or a melt extrusion method. For example, in the case of using polyester represented by each of the chemical formulae (I) to (XVI) or (VIIB) to (XVIB) or poly aryl ether ketone represented by the chemical formula (IA), there is a case that a polymer ring is spontaneously aligned so that a refractive index nz in the film thickness direction becomes smaller than the maximum refractive index nx in the step of volatilizing a solvent. In this case, a solution flow-expanding method preferably is used from the viewpoint of exertion of birefringence properties of the second optical compensation layer.

The solution flow-expanding method is a method in which a solution is prepared by dissolving a polymer that forms the second optical compensation layer in a solvent, this solution is flow-expanded and applied onto the surface of a base, and the resultant base is dried. The base is not particularly limited, and may be a single layer or a laminate (for example, including an anchor coated layer) of multiple layers. Specific examples of the base include a glass plate and a polymer film. In the case of using a glass plate as the base, one used for a liquid crystal cell, such as an alkali-free glass is preferable. By the use of a polymer film as a base, the base can have exchangeability. The raw material of the polymer film used to form a base is not particularly limited as long as the raw material is a polymer having film forming properties. Examples of the raw material include a styrene polymer, a (meta)acrylic acid polymer, an ester polymer, an olefin polymer, a norbornene polymer, an imide polymer, a cellulose polymer, a vinyl alcohol polymer, and a carbonate polymer. In the case where the base includes an anchor coated layer, the anchor coated layer is not particularly limited, and is, preferably a vinyl alcohol polymer or an urethane polymer in point of having favorable adhesion with a polymer. The thickness of the anchor coated layer preferably is in the range of 0.01 to 5 μm.

A material for forming the base film may be the same as that of above-mentioned plastic film used as a protective layer of the polarizer, or the protective layer itself of the polarizer may also function as the base film. That is, the second optical compensation layer may be formed by directly applying the solution to a polarizer (typically, a protective layer of a polarizer) (i.e., the protective layer of the polarizer may also function as the base film), or may be formed on any appropriate base film and then transferred the second optical compensation layer to the polarizer (typically, to the protective layer of the polarizer). The method by transferring may further include removal of the base.

The thickness of the base is not particularly limited except that it is limited by the intended use of the base, and is, for example, in the range of 1 to 1000 µm.

The solvent for the solution (the applying solution) used for the flow-expanding and the applying is not particularly limited, and examples thereof include halogenated hydrocarbons such as chloroform, dichloromethane, carbon tetrachloride, dichloroethane, tetrachloroethane, trichloroethylene, tetrachloroethylene, chlorobenzene, and o-dichlorobenzene; phenols such as phenol and para chloro phenol; aromatic hydrocarbons such as benzene, toluene, xylene, methoxybenzene, and 1,2-dimethoxybenzene; ketone solvents such as acetone, methyl ethyl ketone, methyl isobutyl ketone, cyclohexane, cyclopentane, 2-pyrolidone, and N-methyl-2-pyrolidone; ester solvents such as ethyl acetate and butyl acetate; alcohol solvents such as t-butylalcohol, glycerin, ethylene glycol, triethylene glycol, ethylene glycol monomethyl ether, diethylene glycol dimethyl ether, propylene glycol, dipropylene glycol, and 2-methyl-2,4-pentane diol; amide solvents such as dimethylformamide and dimethylacetamide; nitrile solvents such as acetonitrile and butyronitrile; ether solvents such as diethyl ether, dibutyl ether, and tetrahydrofuran; carbon disulfide; ethyl cellosolve; and butyl cellosolve. These solvents may be used alone or in a combination of two or more of them.

In particular, polyesters represented by the chemical formulae (I) to (XVI) and (VIIB) to (XVIB), respectively, and poly aryl ether ketone represented by the chemical formula (IA) are superior in solubility. Thus, a solvent that erodes less polymer film base such as toluene, methyl isobutyl ketone, cyclopentane, and ethyl acetate can be used. Therefore, a base that could not be used in a conventional ester polymer because it is eroded drastically, such as a film consisting primarily of a (meta)acrylic acid polymer or a olefin polymer also can be used. Thus, it becomes possible to reduce the production cost. It is to be noted that (meta)acrylic acid means one of acrylic acid and metacrylic acid. Among the solvents, toluene is particularly preferable from the viewpoint of having low polarity and less erosion of the base.

The concentration of the non-liquid crystalline polymer in the solution may be any appropriate concentration as long as the above-described second optical compensation layer such as described above is obtained, and applying and flow-expanding can be carried out. The solution contains a non-liquid crystalline polymer, for example, in the range of 1 to 40 parts by weight, preferably in the range of 5 to 50 parts by weight, and more preferably in the range of 10 to 40 parts by weight, with respect to 100 parts by weight of a solvent. With such concentration range, a solution obtains a viscosity with which applying and flow-expanding is easily carried out.

Examples of flow-expanding and applying methods include a spin coating method, a roller coating method, a flow coating method, a printing method, a dip coating method, a film flow-expanding method, a bar coating method, and gravure printing method. As an applying means, any coater such as a spin coater, a die coater, or a bar coater is used. After the application, for example, a solvent in the solution is evaporated and removed by drying by natural air, air drying, or drying by heating, and thus, the second optical compensation layer is formed. As a heat-drying means, any drying machine such as an air circulation drying oven or a heat drum is used. The temperature of the heat drying is not particularly limited, and is, for example 40° C. or more, preferably 60° C. or more, and the upper limit of the temperature is, for example, 250° C. or less and preferably 200° C. or less.

The applying solution may further contain various additives such as stabilizers, plasticizers, and metals.

As mentioned above, the material for forming the second optical compensation layer is any material. Thus, the applying solution may also contain any polymer. The applying solution may not contain polyesters represented by the chemical formulae (I) to (XVI) and (VIIB) to (XVIB), respectively, and poly aryl ether ketone represented by the chemical formula (IA). However, it is preferable that the applying solution contains one or both of at least one of polyesters represented by the chemical formulae (I) to (XVI) and (VIIB) to (XVIB), respectively, and poly aryl ether ketone represented by the chemical formula (IA) from the viewpoint of obtaining the second optical compensation layer having superior properties as mentioned above. Further, the applying solution may further contain other different resin if necessary besides one or both of at least one of polyesters represented by the chemical formulae (I) to (XVI) and (VIIB) to (XVIB), respectively, and poly aryl ether ketone represented by the chemical formula (IA). Examples of such other resin include various types of general-purpose resins, engineering plastics, thermoplastic resins, and thermosetting resins. By the use of such resin in combination with one or both of at least one of polyesters represented by the chemical formulae (I) to (XVI) and (VIIB) to (XVIB), respectively, and poly aryl ether ketone represented by the chemical formula (IA), it becomes possible to form the second optical compensation layer having appropriate mechanical strength and durability according the purpose. Examples of the general-purpose resin include polyethylene (PE), polypropylene (PP), polystyrene (PS), polymethylmethacrylate (PMMA), an ABS resin, and an AS resin. Examples of the engineering plastics include polyacetate (POM), polycarbonate (PC), polyamide (PA: nylon), polyethylene terephthalate (PET), and polybutylene terephthalate (PBT). Examples of the thermoplastic resin include polyphenylene sulfide (PPS), polyethersulfone (PES), polyketone (PK), polyimide (PI), poly cyclohexane dimethanol terephthalate (PCT), polyarylate (PAR), and a liquid crystal polymer (LCP). Examples of the thermosetting resin include an epoxy resin and a phenol novolac resin. The types and amounts of these different resins to be added to an applying solution can be set as appropriate according to the purpose. Such other resin can be add so that a ratio of the resin becomes preferably in the range of 0% to 50% by mass, more preferably 0% to 30% by mass, with respect to the total mass of polyesters represented by the chemical formulae (I) to (XVI) and (VIIB) to (XVIB), respectively, and poly aryl ether ketone represented by the chemical formula (IA).

As the other resin material composing the second optical compensation layer, for example, poly(4,4'-hexafluoroisopropylidene-bisphendterephthalate-co-isophthalate, poly(4,4'-hexahydro-4,7-methanoindan-5-ylidene bisphenol) terephthalate, poly(4,4'-isopropylidene-2,2',6,6'-tetrachloro bisphenol)terephthalate-co-isophthalate, poly(4,4'-hexafluoroisopropylidene)-bisphenol-co-(2-norbornylidene)-bisphenol terephthalate, poly(4,4'-hexahydro-4,7-metha noindan-5-ylidene)-bisphenol-co-(4,4'-isopropylidene-2,2', 6,6'-tetrabromo)-bisphenol terephthalate, poly(4,4'-isopropylidene-bisphenol-co-4,4'-(2-norbornylidene) bisphenol)terephthalate-co-isophthalate, or a copolymer thereof may be employed. These may be used alone or in a combination of two or more of them.

[1-4. Method for Producing Liquid Crystal Panel]

A method for producing the liquid crystal panel of the present invention is not particularly limited, and the liquid crystal panel can be produced by, for example, as mentioned above, laminating the first polarizer, the first optical compensation layer, the liquid crystal cell, the second optical compensation layer, the second polarizer via a pressure-sensitive adhesive or an adhesive. This lamination method is not particularly limited, and for example, the conventional method for producing the liquid crystal panel may be used as appropriate for reference purposes. The lamination of the first optical compensation layer and the first polarizer and the lamination of the second optical compensation layer and the second polarizer are more specifically described as follows.

[1-4-1. Lamination of First Optical Compensation Layer and First Polarizer]

The first polarizer and the first optical compensation layer preferably are laminated on each other via a pressure-sensitive adhesive or an adhesive. To take FIG. 1 as an example, the first polarizer 30 and the first optical compensation layer 60 are directly laminated on each other via a pressure-sensitive adhesive or an adhesive.

It is preferable that a surface of the first optical compensation layer on which the first polarizer is laminated is subjected to an easy-adhesion treatment. As the easy-adhesion treatment, applying a resin material is preferable. As the resin material, a silicon resin, an urethane resin, or an acrylic resin is preferable. By subjecting the surface to the easy-adhesion treatment, an easy-adhesion layer is formed. The thickness of the easy-adhesion layer is preferably in the range of 5 to 100 nm, more preferably in the range of 10 to 80 nm.

It is preferable that the first polarizer is laminated directly on the first optical compensation layer via a pressure-sensitive adhesive or an adhesive. In the case where the first optical compensation layer is subjected to an easy-adhesion treatment, it is preferable that the first polarizer is laminated directly on the surface of the first optical compensation layer, to which the easy-adhesion treatment was carried out, via a pressure-sensitive adhesive or an adhesive. The pressure-sensitive adhesive forms a pressure-sensitive adhesive layer, and the adhesive forms an adhesive layer. The pressure-sensitive adhesive or an adhesive may be applied on the first polarizer side, the first optical compensation layer side, or both sides of the first polarizer and the first optical compensation layer.

The thickness of the pressure-sensitive adhesive layer can be set as appropriate according to the purpose of using the layer and the adhesion of the same. In particular, the thickness of the pressure-sensitive adhesive layer is preferably in the range of 1 to 100 μm, more preferably in the range of 3 to 50 μm, yet more preferably in the range of 5 to 30 μm, and particularly preferably in the range of 10 to 25 μm.

As the pressure-sensitive adhesive that forms the pressure-sensitive adhesive layer, any appropriate pressure-sensitive adhesive can be employed. Specific examples thereof include solvent-type pressure-sensitive adhesives, non-aqueous emulsion-type pressure-sensitive adhesives, aqueous-type pressure-sensitive adhesives, and hot-melt pressure-sensitive adhesives. Among them, the solvent-type pressure-sensitive adhesive in which an acrylic polymer is a base polymer is particularly preferable because it exerts appropriate pressure-sensitive adhesive properties (wettability, cohesiveness, and adhesiveness) to the first polarizer and the first optical compensation layer and is superior in optical transparency, weather resistance, and heat resistance.

The adhesive layer is formed by applying an applying solution containing the predetermined ratio of adhesive onto the surface of the first optical compensation layer and/or the surface of the first polarizer, and drying them. As a method for preparing the applying solution, any appropriate method can be employed. For example, a commercially available solution or a dispersion liquid, one obtained by further adding a solvent in the commercially available solution or dispersion liquid, or one obtained by dissolving or dispersing a solid content in a variety of solvents may be used.

[1-4-2. Lamination of Second Optical Compensation Layer and Second Polarizer]

As mentioned above, the second optical compensation layer of the present invention can be preferably formed as a coated layer on a base. In the case where the base functions also as a protective layer of a polarizer (for example, in the case where the base is a cellulose film such as triacetyl cellulose film), it is preferable that the surface of the base, which is opposite to the surface to which the coated layer has been formed and the second polarizer are attached to each other via a pressure-sensitive adhesive or an adhesive. In the case where the base does not function as a protective layer of a polarizer, it is preferable that the second optical compensation layer is transferred to the second polarizer or the protective layer of the second polarizer, and then, the base is removed. The pressure-sensitive adhesive or the adhesive is not particularly limited, and is the same as that described in, for example, the section [1-4-1. Lamination of first optical compensation layer and first polarizer].

[2. Liquid Crystal Display]

Figure 2:
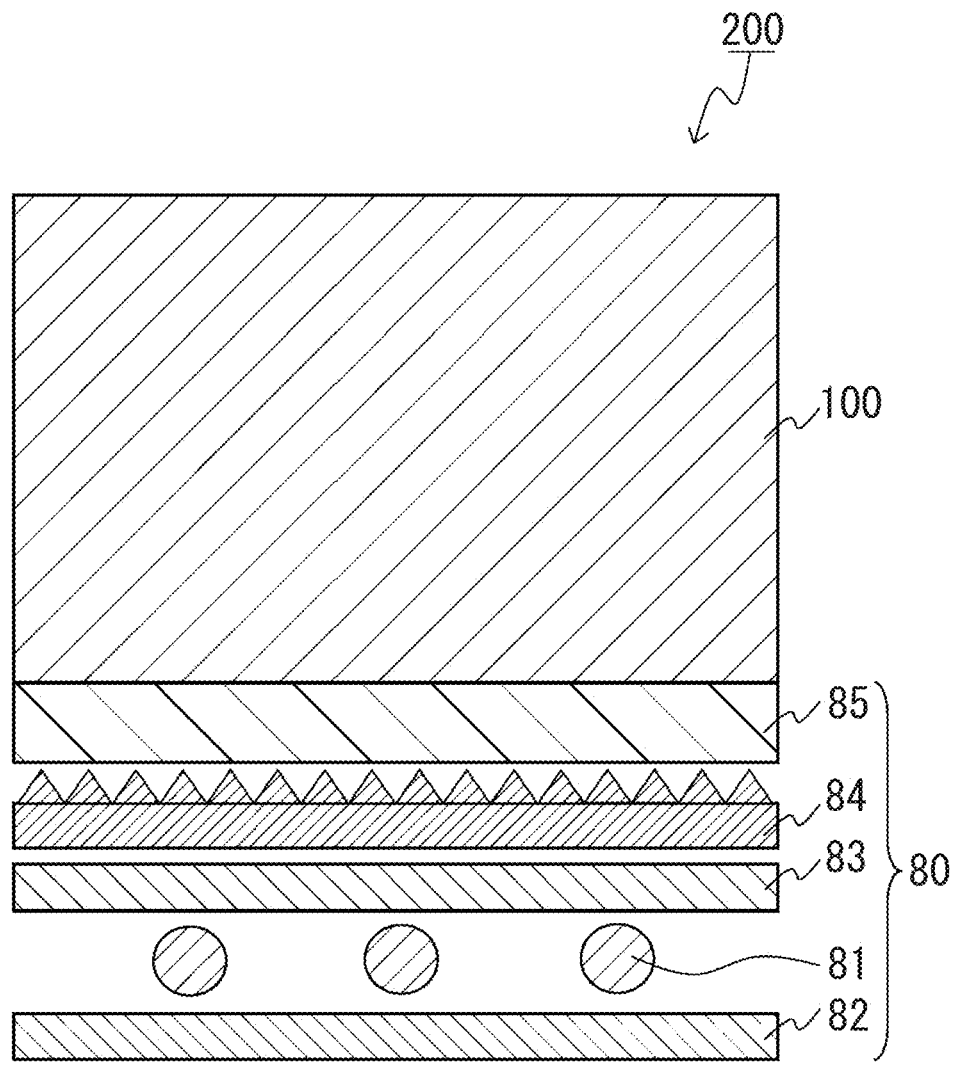
FIG. 2 is a schematic sectional view showing an example of a configuration of a liquid crystal panel of the present invention.

The liquid crystal display of the present invention is not particularly limited except that it includes the liquid crystal panel of the present invention, as mentioned above. An example of the configuration of the liquid crystal display of the present invention is shown in the schematic sectional view of FIG. 2. In FIG. 2, the sizes, proportions, and the like of the respective components are different from the actual sizes, proportions, and the like for the sake of simplicity in illustration. As shown in FIG. 2, this liquid crystal display 200 includes at least a liquid crystal panel 100 and a direct-type backlight unit 80 arranged on one side of the liquid crystal panel 100. The direct-type backlight unit 80 includes at least an optical source 81, a reflection film 82, a diffusion plate 83, a prism sheet 84, and a brightness enhancement film 85. It is to be noted that, in FIG. 2, the structures of respective components of the liquid crystal panel 100 are not shown to simplify in illustration. The structures of the respective components of the liquid crystal panel 100 are not particularly limited, and are, for example, the same as those in FIG. 1. In the liquid crystal display 200 of FIG. 2, a direct-type backlight unit is employed as a backlight unit, but the present invention is not limited to this. For example, the backlight unit may be a sidelight-type backlight unit. The sidelight-type backlight unit further includes at least a light guide plate and a light reflector besides the components of the direct-type backlight unit. Some of the components shown as examples in FIG. 2 can be abbreviated or replaced by other optical elements according to the intended use such as a illuminating system of the liquid crystal display or a driving mode of the liquid crystal cell.

The liquid crystal display of the present invention may be a transmission type liquid crystal display in which the screen is seen by being irradiated with light from the backlight side of the liquid crystal panel of the present invention, may be a reflection type liquid crystal display in which the screen is seen by being irradiated with light from the visible side of the liquid crystal panel of the present invention, or may be a semi-transmission type liquid crystal display having the properties of both the transmission type and the reflection type liquid crystal displays. However, it is preferable that the liquid crystal display of the present invention may be a transmission type liquid crystal display in which the screen is seen by being irradiated with light from the backlight side of the liquid crystal panel of the present invention because the effect of preventing a change in color (color shift) depending on the visible direction becomes further superior and the effect of suppressing light leaking and the effect of preventing brightness unevenness is superior.

The liquid crystal display of the present invention is applicable to any suitable use. Examples of the use thereof include: office automation equipment such as computer monitors, notebook computers, and copy machines; portable devices such as mobile phones, watches, digital cameras, personal digital assistants (PDAs), and portable game devices; household electric appliances such as video cameras, televisions, and microwave ovens; vehicle-mounted devices such as back monitors, car navigation system monitors, and car audios; exhibition devices such as information monitors for commercial stores and projectors; security devices such as surveillance monitors; and nursing care and medical devices such as nursing-care monitors and medical monitors.

EXAMPLES

The present invention is described in detail below with reference to the examples. However, the present invention is not limited by these examples. Measurement methods of the respective properties in the examples were carried out as follows.

[Glass Transition Temperature]

The glass transition temperature was measured using a differential scanning calorimeter ("DSC-6200" (product name), manufactured by Seiko Instruments Inc.) by a method according to JIS K 7121 (1987 version, a method for measuring a transition temperature of a plastic). In particular, the first measurement was conducted by, under the nitrogen atmosphere (at a nitrogen gas flow rate of 50 ml/minute), heating 3 mg of a powder sample from room temperature to 220° C. at a rate of temperature increase of 10° C./minute, and thereafter cooling it to 30° C. at a rate of temperature decrease of 10° C./minute. Next, the second measurement was conducted by heating it to 350° C. at a rate of temperature increase of 10° C./minute. As the glass transition temperature, the value obtained by the second measurement was employed. The temperature correction of the calorimeter was conducted using a standard reference material (indium).

[Weight Average Molecular Weight]

Each sample was prepared so as to be a 0.1% tetrahydrofuran solution. The sample was filtered using a membrane filter with a pore size of 0.45 μm, and thereafter, the weight average molecular weight of the filtrate was measured by a gel permeation chromatography system ("HLC-8820GPC" (product name), manufactured by TOSOH CORPORATION) used as a main body of GPC and RI (that is included in the body of GPC) used as a detector. In particular, a molecular weight was determined from a polystyrene-converted molecular weight using a standard polystyrene calibration curve in which molecular weights are given to process data at a column temperature of 40° C. and a pumping rate of 0.35 mL/minute. As a column to be used, one obtained by connecting Super HZM-M (with the diameter of 6.0 mm×15 cm), Super HZM-M (with the diameter of 6.0 mm×15 cm), and Super HZ 2000 (with the diameter of 6.0 mm×15 cm) in series was used. As a mobile phase, tetrahydrofuran was used.

[Transmittance]

The transmittance at a wavelength of 400 nm was measured using a spectrophotometer ("U-4100" (product name), manufactured by Hitachi Ltd.).

[Birefringence in Thickness Direction]

The birefringence in the thickness direction at the wavelength of 590 nm was measured using "KOBRA-WRP" (product name), manufactured by Oji Scientific Instruments. The birefringence Δnxz[590] in the thickness direction was calculated by a program attached to the device using a front retardation value and a retardation value (R40) at the time when the sample is tilted 40°. As the film thickness, the value determined by "DEKTAK" (product name), manufactured by Sloan was used.

[Solubility]

A polymer was gradually added into each of sample bottles in which each solvent was introduced, and the extent of dissolution was checked by visual observation.

[Retardation]

Refractive indices nx, ny, and nz of each sample film were measured using a automatic birefringence measuring apparatus (AUTOMATIC BIAFRINGENCE ANALYZER KOBRA-WPR, manufactured by Oji Scientific Instruments), and the in-plane retardation Δnd the retardation Rth in the thickness direction were calculated. The measurement temperature was 23° C., and the measurement wavelength was 590 nm.

[Measurement of Color Shift]

Color tones of each liquid crystal display when an azimuthal angle was varied from 0 to 360° with a polar angle being set to 60° were measured using "EZ CONTRAST 160D" (product name) manufactured by ELDIM. The measurement results were plotted on an xy chromaticity diagram. The polar angle is an angle between a straight line obtained by connecting an observation point and a liquid crystal display screen (a straight line indicating the visible direction) and the liquid crystal display screen or a numerical value thereof. The azumthal angle is an angle defined by the followings (1), (2), and (3) or a numerical value thereof.

(1) A plane that includes a straight line along the up-down direction of the liquid crystal display screen and is orthogonal to the liquid crystal display screen was used as a standard plane.

(2) A plane that includes the straight line obtained by connecting an observation point and the liquid crystal display screen and is orthogonal to the liquid crystal display screen (the straight line indicating the visible direction) was used as a visible plane.

(3) An angle between the standard plane and the visible plane, measured clockwise from the standard plane to the visible plane was set to an azimuthal angle.

[Contrast]

Contrasts when an azimuthal angle was varied from 0 to 360° with a polar angle being set to 60° were measured using "EZ CONTRAST 160D (product name)" manufactured by ELDIM.

[Measurement of Black Brightness]

The black brightness when an azimuthal angle was varied from 0 to 360° with a polar angle being set to 60° was determined using "EZ CONTRAST 160D" (product name) manufactured by ELDIM, and a plot showing a relationship between azimuth angles and the black brightness was prepared.

Example 1

A liquid crystal panel and a liquid crystal display of the present invention were produced as follows.

(Production of First Optical Compensation Layer)

8.8 g of polyvinyl alcohol resin ("NH-18" (product name) (with the degree of polymerization of 1800 and the degree of saponification of 99.0%), manufactured by Nippon Synthetic Chemical Industry Co., Ltd.) was dried for 2 hours at 105° C., and then was dissolved in 167.2 g of dimethyl sulfoxide (DMSO). To this, 2.98 g of 2-methoxy-1-naphthoaldehyde and 0.80 g of p-toluene sulfonic acid monohydrate were added, and the resultant solution was stirred for 1 hour at 40° C. Further, 3.18 g of benzaldehyde was added to this reaction solution, and then the reaction solution was stirred for 1 hour at 40° C. Furthermore, 23.60 g of 1,1-diethoxyethane (acetal) was added to the reaction solution, and then the reaction solution was stirred for 3 hours at 40° C. Thereafter, 2.13 g of triethylamine was added to the reaction solution, and then, a reaction was completed. A crude product obtained by this reaction was subjected to reprecipitation with 1 L of methanol, and to filteration, thereby collecting a polymer. This polymer was dissolved in tetrahydrofuran, and the resultant solution was again subjected to reprecipitation with methanol. This was filtered and dried, thereby obtaining 11.5 g of white polymer. This polymer was subjected to $^1$H-NMR, and the polymer had repeating units represented by the following chemical formula (XXII) and a ratio (molar ratio), r:s:t:u, of 11:37:45:7. Further, the glass transition temperature of this polymer was measured using a differential scanning calorimeter and was 123° C. Furthermore, the absolute value of a photoelastic coefficient (C[550]) was $2.4\times10^{-11}$ (m$^2$/N). A first optical compensation layer was produced using this polymer as a raw material.

$^1$H-NMR (DMSO): 0.8-2.3 (main-chain methylene and methyl in an acetal part), 3.4-4.4 (main-chain methine to which an oxygen atom is bound, methyl in a methoxy group, and a hydroxyl group), 4.5-5.1 (methine in an acetal part), 5.4-5.9 (methine in a benzene part), 6.4 (methine in a 2-methoxy naphthalene part), 7.1-7.5 (2-methoxy naphthalene and aromatic proton in benzene part), 7.7-8.8 (2-methoxy naphthalene)

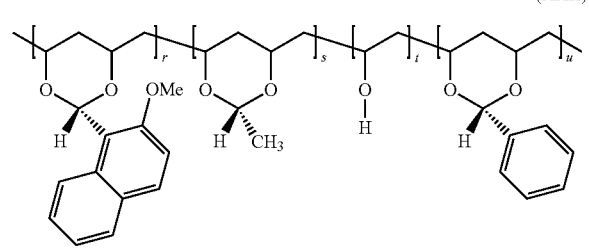

(XXII)

The polymer (the chemical formula (XXII)) synthesized above was dissolved in methyl ethyl ketone (MEK), the resultant solution was applied onto a polyethylene terephthalate film (with the thickness of 70 μm) using an applicator, and it was dried in an air circulation drying oven. Thus, a 110 μm-thick film was produced. This film was removed from the polyethylene terephthalate film, and then was subjected to fixed-end stretching 2 times in the width direction at 140° C. Thus, a first optical compensation layer was obtained. This first optical compensation layer exerted a refractive index anisotropy satisfying nx>ny>nz, had the thickness of 50 μm, and satisfied Re[590]=140 nm, Rth[590]=150 nm, and Nz=1.070. Further, this first optical compensation layer exerted a wavelength dependency of a reverse dispersion and satisfied (Re[450]/Re[550])=0.90.

(Production of Second Optical Compensation Layer)

In a reaction container provided with a stirrer, 3.27 g of 2,2-bis(3,5-dimethyl-4-hydroxyphenyl)-4-methylpentane and 0.20 g of methyl tri n-octylammonium chloride were dissolved in 35 mL of 1M potassium hydrate solution. To this solution, a solution obtained by dissolving 1.53 g of 4,4'-stilbene dicarboxylic acid chloride and 1.02 g of terephthalic acid chloride in 35 mL of chloroform was added at a time while stirring, and the resultant solution was stirred for 90 minutes at room temperature. Thereafter, the polymer solution was subjected to static separation so as to separate a chloroform solution containing a polymer, and then the chloroform solution was washed with an acetic acid aqueous solution, and thereafter washed with an ion-exchange water. Further, it was added to methanol. Thus, the polymer was deposited. The deposited polymer was filtered and dried under reduced pressure. Thus, 4.66 g of white polymer represented by the following chemical formula (XVIII) was obtained.

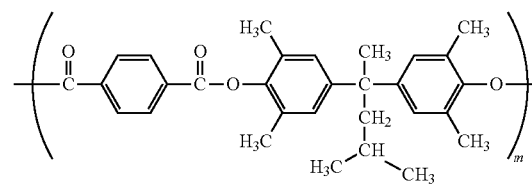

(XVIII)

The polyester (the chemical formula (XVIII)) synthesized above had the glass transition temperature Tg of 230° C. and the weight average molecular weight Mw of 191,000.

19 parts by weight of polyester (the chemical formula (XVIII)) obtained by the above-described synthesizing method was dissolved in 100 parts by weight of toluene. Thus, 16% by mass solution was prepared. This solution was flow-expanded uniformly on the surface of a 75 μm-thick polyethylene terephthalate film ("LUMIRROR-QZ14" (product name), manufactured by TORAY INDUSTRIES INC.) using a comma coater so that the solution is formed into a sheet. Then, a solvent in the solution was evaporated in a multiple-chamber air circulation drying oven (an error of ±1° C.) by gradually increasing the temperature from the low temperature: for 5 minutes at 70° C. and for 5 minutes at 110° C. Thereafter, the polyethylene terephthalate film was removed, and thus a second optical compensation layer was obtained. This second optical compensation layer exerted a refractive index anisotropy satisfying nx=ny>nz, had a thickness of 5 μm, and satisfied Re[590]=0.0 nm, Rth[590]=180.8 nm, and Rth[450]/Rth[550]=1.16.

(Production of Liquid Crystal Panel and Liquid Crystal Display)

A liquid crystal panel was taken out from a commercially available liquid crystal display ("LC46-RXIW" (product name), manufactured by Sharp Corporation) including a VAmode liquid crystal cell, and optical films such as polarizing plates arranged on the upper and lower sides of the liquid crystal cell were all removed. A first optical compensation layer produced as described above and a commercially available polarizing plate ("HEG1425DU" (product name), manufactured by Nitto Denko Corporation) were laminated to each other via an acrylic pressure-sensitive adhesive. Thus, an optical compensation layer-integrated polarizing plate 1 was produced. Further, an optical compensation layer-integrated polarizing plate 2 including a second optical compensation layer was produced in the same manner as described above except that the second optical compensation layer was used as substitute for the first optical compensation layer. Next, the optical compensation layer-integrated polarizing plate 1 was attached on a visible side of the liquid crystal cell, and the optical compensation layer-integrated polarizing plate 2 was attached on the side opposite to the visible side. Thus, a liquid crystal panel of the present invention was produced. Further, a backlight was arranged on the side opposite to the visible side of this liquid crystal panel. Thus, a liquid crystal display of the present invention was produced.

Example 2

A liquid crystal panel and a liquid crystal display of the present invention were produced as follows.

(Production of First Optical Compensation Layer)

A first optical compensation layer was produced in exactly the same manner as in Example 1.

(Production of Second Optical Compensation Layer)

In a reaction container provided with a stirrer, 3.27 g of 2,2-bis(3,5-dimethyl-4-hydroxyphenyl)-4-methylpentane and 0.20 g of methyl tri n-octyl ammonium chloride were dissolved in 35 mL of 1M potassium hydroxide aqueous solution. To this solution, a solution obtained by dissolving 3.05 g of 4,4'-stilbene dicarboxylic acid chloride in 35 mL of chloroform was added at a time while stirring, and the resultant solution was stirred for 90 minutes at the room temperature (23° C.). Thereafter, the polymer solution was allowed to stand still, and a chloroform solution containing a polymer was separated. The chloroform solution was then washed with an acetic acid aqueous solution and thereafter washed with an ion-exchange water. Further, it was added to methanol. Thus, the polymer was deposited. The deposited polymer was filtered and dried under reduced pressure. Thus, a white polymer represented by the following chemical formula (XIX) was obtained.

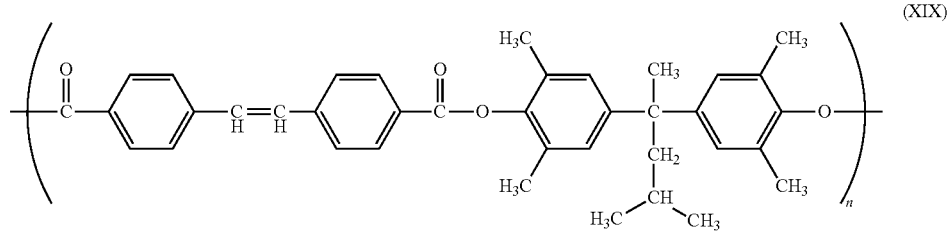

(XIX)

Polyester (the chemical formula (XIX)) synthesized above had the glass transition temperature Tg of 232° C. and the weight average molecular weight Mw of 144,000. Further, 20% by mass or more of this polyester was dissolved in each of cyclopentanone and toluene.

19 parts by weight of this polyester was dissolved in 100 parts by weight of toluene. Thus, a 16% by mass solution was obtained. This solution was flow-expanded and applied onto a glass substrate by a spin coating method, and it was dried for 5 minutes at 70° C. Then, it was dried at 110° C. Thus, a second optical compensation layer was produced. The second optical compensation layer obtained after drying had the thickness of 2.5 μm, the transmittance at the wavelength of 400 nm of 92%. Further, the second optical compensation layer exerted a refractive index anisotropy satisfying nx≈ny>nz and satisfied Re[590]=0.1 nm, Rth[590]=198 nm, and Rth[450]/Rth[550]=1.16.

(Production of Liquid Crystal Panel and Liquid Crystal Display)

A liquid crystal panel and a liquid crystal display were produced in exactly the same manner as in Example 1 except that the second optical compensation layer of Example 1 was replaced with the second optical compensation layer produced in Example 2.

Example 3

A liquid crystal panel and a liquid crystal display of the present invention were produced as follows.

(Production of First Optical Compensation Layer)

A first optical compensation layer was produced in exactly the same manner as in Example 1.

(Production of Second Optical Compensation Layer)

A polymer represented by the following chemical formula (XX) was obtained by the same method as in Example 2 except that 1.53 g of 4,4'-stilbene dicarboxylic acid chloride and 1.02 g of isophthalic acid chloride were used as substituted for 3.05 g of 4,4'-stilbene dicarboxylic acid chloride.

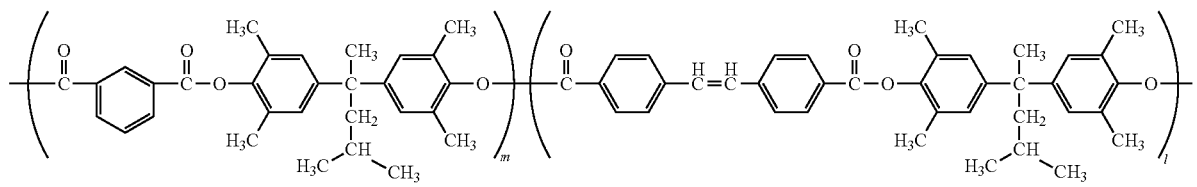

(XX)

Polyester (the chemical formula (XX)) synthesized above had the glass transition temperature Tg of 228° C., and the weight average molecular weight Mw of 108,000.

A second optical compensation layer was produced by the same method as in Example 2 using this polyester (the chemical formula (XX)). The second optical compensation layer obtained after drying had the thickness of 5 μm and the transmittance at the wavelength of 400 nm of 92%. Further, this second optical compensation layer exerted a refractive index anisotropy satisfying nx≈ny>nz, and satisfied Re[590]=0.1 nm, Rth[590]=195 nm, and Rth[450]/Rth[550]=1.16.

(Production of Liquid Crystal Panel and Liquid Crystal Display)

A liquid crystal panel and a liquid crystal display were produced in the same manner as in Examples 1 and 2 except that the second optical compensation layer of Example 1 or 2 was replaced with the second optical compensation layer produced in Example 3.

Example 4

A liquid crystal panel and a liquid crystal display of the present invention were produced as follows.

(Production of First Optical Compensation Layer)

A first optical compensation layer was produced in exactly the same manner as in Example 1.

(Production of Second Optical Compensation Layer)

Poly aryl ether ketone (manufactured by NIPPON SHOKUBAI CO., LTD.) with the molecular weight of 200,000, which is represented by the following chemical formula (XIIIA) was dissolved in methyl isobutyl ketone. Thus, 20% by mass solution was prepared. This solution was flow-expanded uniformly on the surface of a 75 μm-thick polyethylene terephthalate film ("LUMIRROR QZ14" (product name), manufactured by TORAY INDUSTRIES INC.) using a comma coater so that the solution is formed into a sheet. Then, the resultant film was dried by evaporating a solvent in the solution in a multiple-chamber air circulating drying oven. The drying was carried out by gradually increasing the temperature in the oven (an error of ±1° C.) from the low temperature: first, for 5 minutes at 70° C., and next, for 5 minutes at 120° C. The resultant polyethylene terephthalate film was removed. Thus, a second optical compensation layer was obtained. This second optical compensation layer exerted a refractive index anisotropy satisfying nx≈ny>nz, had the thickness of 20 μm, and satisfied Rth[450]/Rth[550]=1.16.

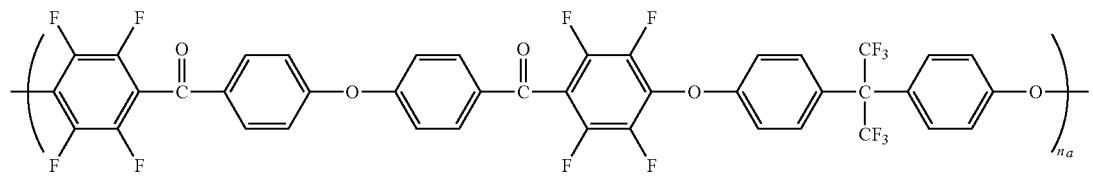

(XIIIA)

(Production of Liquid Crystal Panel and Liquid Crystal Display)

A liquid crystal panel and a liquid crystal display were produced in exactly the same manner as in Examples 1 and 2 except that the second optical compensation layers of Example 1 or 2 was replaced with the second optical compensation layer produced in Example 4.

Example 5

A liquid crystal panel and a liquid crystal display of the present invention were produced as follows.

(Production of First Optical Compensation Layer)

A first optical compensation layer was produced in exactly the same manner as in Example 1.

(Production of Second Optical Compensation Layer)

In a reaction container provided with a stirrer, 0.90 g of 2,2-bis(3,5-dimethyl-4-hydroxyphenyl)-4-methylpentane and 0.03 g of benzyl triethyl ammonium chloride were dissolved in 15 ml of 1M sodium hydroxide solution. A solution obtained by dissolving 0.39 of 4,4-biphenyl dicarboxylic acid chloride and 0.28 g of isophthalic acid chloride in 15 ml of chloroform was added to this solution at a one time while stirring, and then the resultant solution was stirred for 90 minutes at room temperature. Thereafter, the obtained polymer solution was subjected to static separation so as to separate the chloroform solution containing a polymer, and then the chloroform solution was washed with an acetic acid aqueous solution, and thereafter washed with an ion-exchange water. Further, it was added to methanol. Thus, the polymer was deposited. The deposited polymer was filtered and dried under reduced pressure. Thus, 1.21 g of white polymer represented by the following chemical formula (XXIII) was obtained.

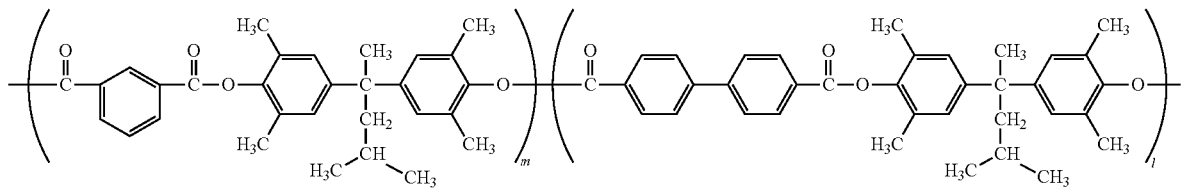
(XXIII)

Polyester (XXIII) (19 parts by weight) obtained by the above-described synthesizing method was dissolved in toluene (100 parts by weight). Thus, 16% by mass solution was prepared. This solution was flow-expanded uniformly on the surface of a 75 μm-thick polyethylene terephthalate film ("LUMIRROR QZ14" (product name), manufactured by TORAY INDUSTRIES INC.) using a comma coater so that the solution is formed into a sheet. Then, a solvent in the solution was evaporated in a multiple-chamber air circulation drying oven, and thus, the film was dried. The drying was carried out by gradually increasing the temperature in the oven (an error of ±1° C.) from the low temperature: first, for 5 minutes at 70° C., and next, for 5 minutes at 110° C. Then, the resultant polyethylene terephthalate film was removed, and thus a second optical compensation layer was obtained. This second optical compensation layer exerted a refractive index anisotropy satisfying nx≈ny>nz, had the thickness of 7 μm, and satisfied Rth(450)/Rth(550)=1.10.
(Production of Liquid Crystal Panel and Liquid Crystal Display)
A liquid crystal panel and a liquid crystal display were produced in exactly the same manner as in Examples 1 and 2 except that the second optical compensation layer of Examples 1 or 2 was replaced with the second optical compensation layer produced in Example 5.

Comparative Example 1

A liquid crystal panel and a liquid crystal display were produced as follows.
(Production of First Optical Compensation Layer)
A first optical compensation layer was produced in exactly the same manner as in Example 1.
(Production of Second Optical Compensation Layer)
Polyimide (the following chemical formula (XXI)) synthesized from 2,2-bis(3,4-dicarboxyphenyl)hexafluoropropane dianhydride (6FDA) and 2,2'-bis(trifluoromethyl)-4,4-diaminobiphenyl (TFMB) was dissolved in cyclohexane. Thus, 15% by mass polyimide solution was prepared.

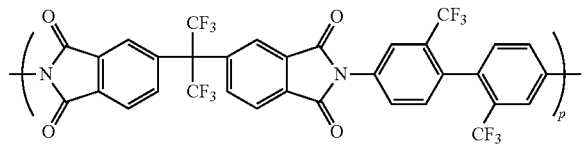
(XXI)

This polyimide solution was applied onto a triacetyl cellulose base (a transparent polymer film) so as to have the thickness of 30 μm. Thereafter, it was subjected to drying treatment for 10 minutes at 100° C. Thus, a second optical compensation layer was obtained. This second optical compensation layer exerted a refractive index anisotropy satisfying nx≈ny>nz, had the thickness of 4 μm, and satisfied Re[590]=0.2 nm, Rth[590]=130 nm, Rth[450]/Rth[550]=1.08.
(Production of Liquid Crystal Panel and Liquid Crystal Display)
A liquid crystal panel and a liquid crystal display were produced in exactly the same manner as in Example 1 except that the second optical compensation layer of Example 1 was replaced with the second optical compensation layer produced in Comparative Example 1.

Comparative Example 2

A liquid crystal panel and a liquid crystal display were produced as follows.
(Production of First Optical Compensation Layer)
A norbornene resin film ("ARTON", manufactured by JSR Corporation) was stretched 1.5 times in an air circulation drying oven at the temperature of 140° C. by a free-end uniaxial stretching method using a tenter stretching machine. Thus, a first optical compensation layer was produced. This first optical compensation layer exerted a refractive index anisotropy satisfying nx>ny≈nz, had the thickness of 80 μm, and satisfied Rth(450)/Rth(550)=1.00.
(Production of Second Optical Compensation Layer)
A second optical compensation layer was produced in exactly the same manner as in Comparative Example 1.
(Production of Liquid Crystal Panel and Liquid Crystal Display)
A liquid crystal panel and a liquid crystal display were produced in exactly the same manner as in Example 1 except that the first optical compensation layer and the second optical compensation layer of Example 1 were replaced with the first optical compensation layer and the second optical compensation layer produced in Comparative Example 2, respectively.

Comparative Example 3

A liquid crystal panel and a liquid crystal display were produced as follows.
(Production of First Optical Compensation Layer)
A polycarbonate resin film ("PURE-ACE" (product name), manufactured by TEIJIN Limited) was used as a first optical compensation layer. This first optical compensation layer exerted a refractive index anisotropy satisfying nx>ny≈nz, had the thickness of 50 μm, and satisfied Rth(450)/Rth(550)=1.08.
(Production of Second Optical Compensation Layer)
A second optical compensation layer was produced in exactly the same manner as in Comparative Example 1.
(Production of Liquid Crystal Panel and Liquid Crystal Display)
A liquid crystal panel and a liquid crystal display were produced in exactly the same manner as in Example 1 except that the first optical compensation layer and the second optical compensation layer of Example 1 were replaced with the first optical compensation layer and the second optical compensation layer produced in Comparative Example 3, respectively.

Comparative Example 4

Figure 3:
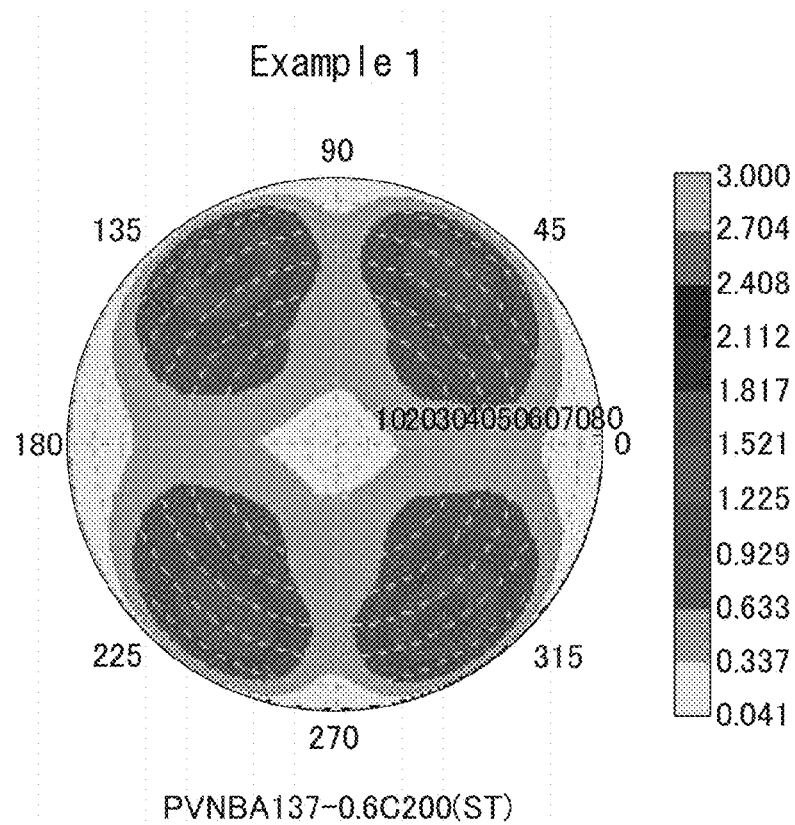
FIG. 3 shows the results of evaluating black brightness of liquid crystal displays of the examples and the comparative examples by varying a viewing direction.
Figure 3:
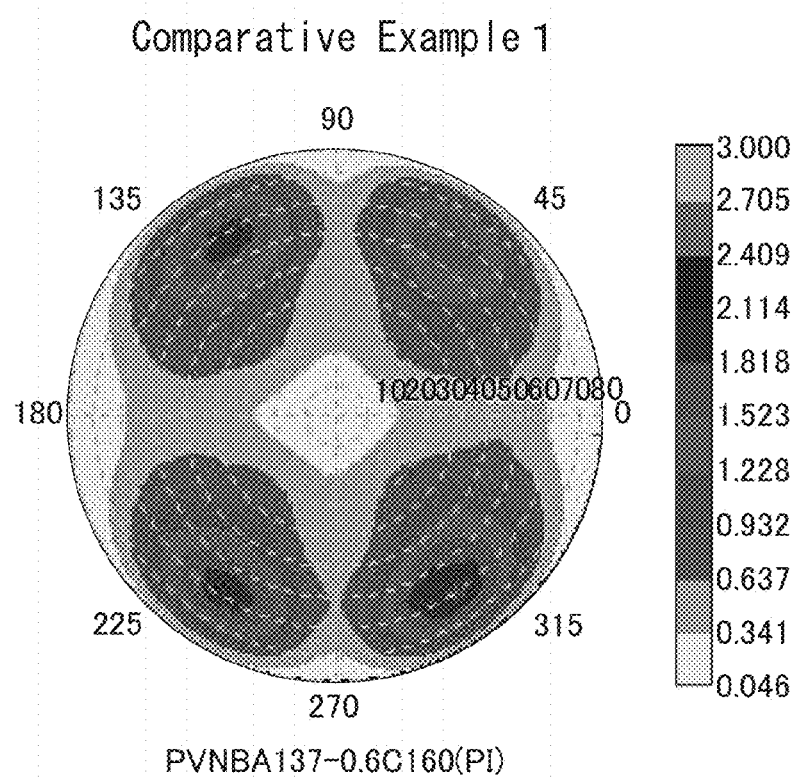
Figure 4:
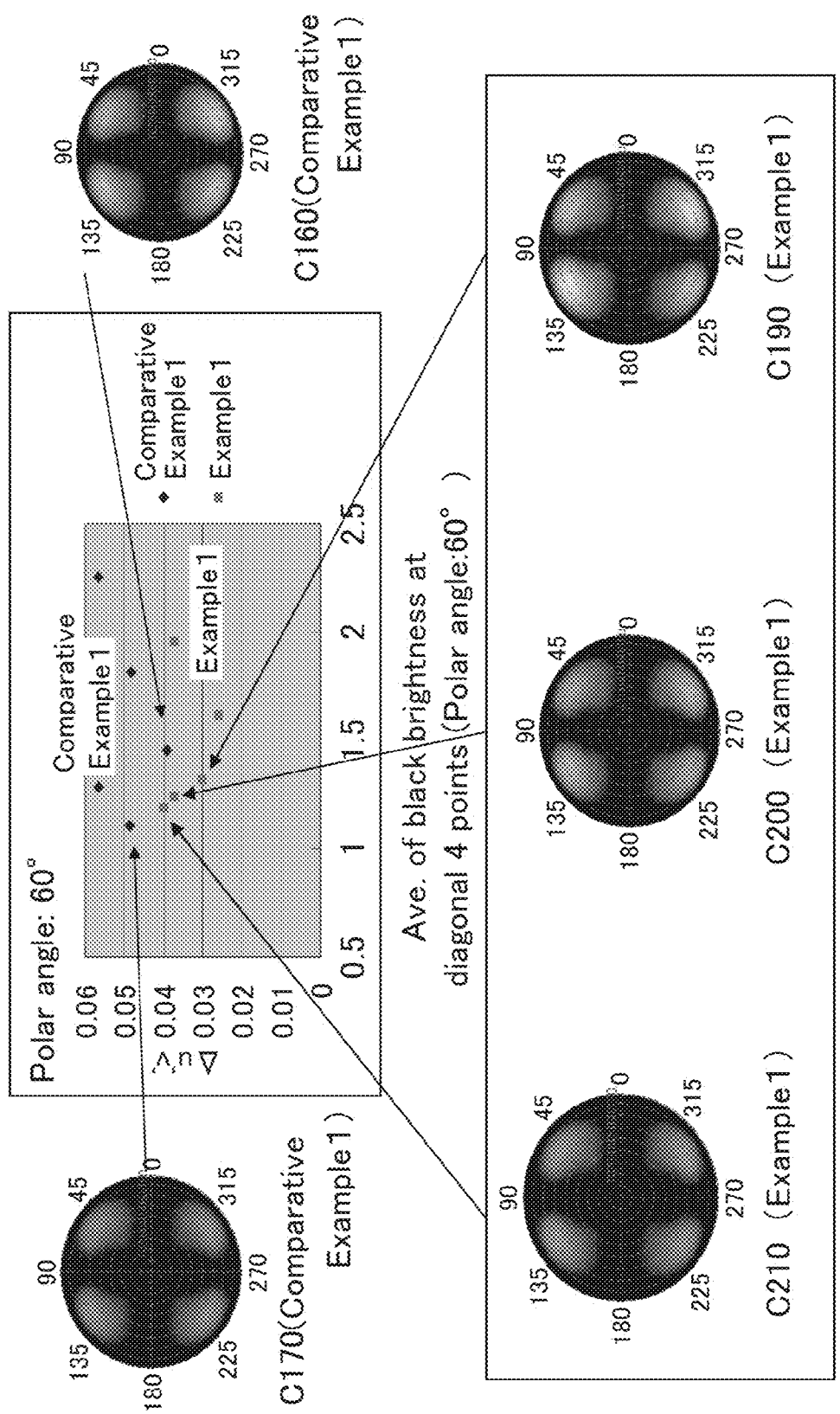
FIG. 4 shows the results of evaluating changes in color of liquid crystal displays of the examples and the comparative Examples by varying a viewing direction.

A liquid crystal panel and a liquid crystal display were produced as follows.
(Production of First Optical Compensation Layer)
A first optical compensation layer was produced in exactly the same manner as in Example 1.
(Production of Second Optical Compensation Layer)
A cellulose resin film ("FUJITAC" (product name), manufactured by FUJIFILM Corporation) was used as a second optical compensation layer. This second optical compensation layer exerted a refractive index anisotropy satisfying nx≈ny>nz, had the thickness of 80 μm, and satisfied Rth(450)/Rth(550)=0.92.
(Production of Liquid Crystal Panel and Liquid Crystal Display)
A liquid crystal panel and a liquid crystal display were produced in exactly the same manner as in Example 1 except that the second optical compensation layer of Example 1 was replaced with the second optical compensation layer produced in Comparative Example 4.
[Evaluation of Black Brightness]
As mentioned above, black brightness of each of the liquid crystal displays of Example 1 and Comparative Example 1 in the case where an azimuthal angle was varied from 0 to 360° with a polar angle being set to 60° was determined using "EZ CONTRAST 160D" (product name) manufactured by ELDIM, and a plot showing a relationship between azimuth angles and the black brightness was prepared. The results are shown in FIG. 3. As shown in FIG. 3, in the liquid crystal display of Example 1, black brightness was kept low at all directions. On the other hand, in the liquid crystal display of Comparative Example 1, increases in black brightness were shown at some azimuthal angles of about 315°, for example. In FIG. 3, light and dark of the result was displayed in reverse so as to clarify the difference between Example 1 and Comparative Example 1. In Comparative Example 1, the areas in which color is specifically dark at azimuthal angles of about 315°, 225°, and 135° are areas in which values of black brightness are specifically high (in the range of 2.114 to 2.409). In the examples, the region in which a black brightness value is more than 2.112 was not present, and in the comparative examples, the region in which a black brightness value is more than 2.409 was not present.
[Evaluation of Color Shift]
As mentioned above, color tones and contrasts of each of the liquid crystal display of Example 1 and Comparative Example 1 in the case where an azimuthal angle was varied from 0 to 360° with a polar angle being set to 60° were measured using "EZ CONTRAST 160D" (product name) manufactured by ELDIM. In this color shift evaluation, five liquid crystal displays that are identical to that mentioned above except that each retardation Rth (nm) was changed as appropriate by adjusting the thickness of the second optical compensation layer were produced, with respect to each of Example 1 and Comparative Example 1, and the measurements were carried out with respect to each of five liquid crystal displays. The measurement results are shown in FIG. 4. The graph in the center of FIG. 4 is a graph obtained by plotting the respective degrees of change in color (color shift) at some azimuthal angles in the range of 0° to 360° with respect to the five liquid crystal displays of each of Example 1 and Comparative Example 1. In FIG. 4, the horizontal axis indicates the average value of black brightness at azimuthal angles of 45°, 135°, 225°, and 315°. The vertical axis indicates the value of the difference (Δu'v') at the time when the difference between a hue and a neutral point becomes maximum in the case where an azimuthal angle was varied from 0 to 360° with a polar angle being set to 60°. Thus, as the plot is at the lower left, a color shift is small and favorable, and as the plot is at the upper right, a color shift is large. Further, in the surrounding figures, the contrast figures of each of the liquid crystal displays of Example 1 and Comparative Example 1 at the time when each of the retardation Rth (nm) in the thickness direction of the second optical compensation layer was varied to various values. "C160", "C170", "C190", "C200", and "C210" means retardation Rth (nm) in the thickness direction at the light wavelength of 590 nm of 160, 170, 190, 200 nm, and 210 nm, respectively.

As shown in FIG. 3, as compared with the liquid crystal display of Comparative Example 1, the liquid crystal display of Example 1 had small black brightness and had favorable display properties.

Further, as shown in FIG. 4, as compared with the liquid crystal display of Comparative Example 1, the liquid crystal display of Example 1 had a small color shift, a large contrast ratio at the wide range of the azimuthal angle (the view angle), and favorable display properties.

Further, with respect to each of Examples 1 to 5 and Comparative Examples 1 to 4, five liquid crystal display samples were prepared, and black brightness and color shift values were measured by the same measuring method as in FIG. 4. The results are shown in Table 1 below. In the following Table 1, "a color shift (Δu'v')" indicates the maximum difference among the differences between hues and neutral points in the five samples (liquid crystal displays) when an azimuthal angle was in the range of 0 to 360° with a polar angle being set to 60°, i.e., the color shift of the sample in which a color shift (Δu'v') value is the lowest. The "black brightness" indicates the average value of black brightness at the azimuthal angle of 45°, 135°, 225°, and 315° in the same samples. As shown in Table 1, as compared with the liquid crystal displays of Comparative Examples 1 to 4, the liquid crystal displays of Examples 1 to 5 could obtain small color shift values and small black brightness values, and could exert superior display properties.

TABLE 1

| | First optical compensation layer | | Second optical compensation layer | | | Color | |
|---|---|---|---|---|---|---|---|
| | Material | Wavelength dispersion | Material | Wavelength dispersion | Re[450]/Re[550] | shift (Δu'v') | Black brightness |
| Ex. 1 | PVNBA*[1] | Reverse | Polyester (XVIII) | Normal | 1.16 | 0.03 | 1.3 |
| Ex. 2 | PVNBA | Reverse | Polyester (XIX) | Normal | 1.16 | 0.03 | 1.3 |

TABLE 1-continued

| | First optical compensation layer | | Second optical compensation layer | | | Color | |
|---|---|---|---|---|---|---|---|
| | Material | Wavelength dispersion | Material | Wavelength dispersion | Re[450]/Re[550] | shift (Δu'v') | Black brightness |
| Ex. 3 | PVNBA | Reverse | Polyester (XX) | Normal | 1.16 | 0.03 | 1.3 |
| Ex. 4 | PVNBA | Reverse | Poly aryl ether ketone (XIII A) | Normal | 1.16 | 0.03 | 1.3 |
| Ex. 5 | PVNBA | Reverse | Polyester (XXIII) | Normal | 1.10 | 0.04 | 1.3 |
| Comp. Ex. 1 | PVNBA | Reverse | Polyimide (XXI) | Normal | 1.08 | 0.04 | 1.4 |
| Comp. Ex. 2 | Arton | Flat | Polyimide (XXI) | Normal | 1.08 | 0.06 | 1.3 |
| Comp. Ex. 3 | Polycarbonate | Normal | Polyimide (XXI) | Normal | 1.08 | 0.07 | 1.5 |
| Comp. Ex. 4 | PVNBA | Reverse | Cellulose ester | Reverse | 0.92 | 0.05 | 1.6 |

*[1]"PVNBA" is a polymer represented by the chemical formula (XXII).

As explained above, the present invention can provide a liquid crystal panel that can realize a display with extremely small change in color depending on the visible direction and a liquid crystal display including the same. The liquid crystal panel of the present invention is applicable to a liquid crystal panel including a thin liquid crystal cell and a large-screen liquid crystal display, but is not limited by this, and can be used to any liquid crystal display. The present invention is applicable to, for example, office automation equipment such as computer monitors, notebook computers, and copy machines; portable devices such as mobile phones, watches, digital cameras, personal digital assistants (PDAs), and portable game devices; household electric appliances such as video cameras, televisions, and microwave ovens; vehicle-mounted devices such as back monitors, car navigation system monitors, and car audios; exhibition devices such as information monitors for commercial stores and projectors; security devices such as surveillance monitors; and nursing care and medical devices such as nursing-care monitors and medical monitors.

The embodiments and examples are for exemplification, and do not limit the present invention. The present invention may be achieved by other embodiments as long as the purpose and the basic characteristics of the present invention are not departed. Various changes and equivalents, which are understood by those skilled in the art in the scope of the present invention can be applied to the configuration and detail of the present invention.

REFERENCE SIGNS LIST

| 30 | first polarizer |
|---|---|
| 50 | second polarizer |
| 60 | first optical compensation layer |
| 70 | second optical compensation layer |
| 40 | liquid crystal cell |
| 41, 42 | substrate |
| 43 | liquid crystal layer |
| 44 | spacer |
| 80 | backlight unit |
| 81 | optical source |
| 82 | reflection film |
| 83 | diffusion plate |
| 84 | prism sheet |
| 85 | brightness enhancement film |
| 100 | liquid crystal panel |
| 200 | liquid crystal display |

What is claimed is:

1. A liquid crystal panel, comprising:
a liquid crystal cell,
a first polarizer arranged on one surface of the liquid crystal cell;
a second polarizer arranged on an other surface of the liquid crystal cell;
a first optical compensation layer arranged between the first polarizer and the liquid crystal cell; and
a second optical compensation layer arranged between the second polarizer and the liquid crystal cell, wherein:
the first optical compensation layer satisfies the following mathematical formulae (1) and (2), and
the second optical compensation layer satisfies the following mathematical formulae (3) and (4), $$nx > ny \geq nz \tag{1}$$

$$(Re[450]/Re[550]) < 1.00 \tag{2}$$

$$nx \geq ny > nz \tag{3}$$

$$(Rth[450]/Rth[550]) \geq 1.10 \tag{4}$$

where in the mathematical formulae (1), (2), (3), and (4),
nx denotes a maximum refractive index in a plane direction of each of the first optical compensation layer and the second optical compensation layer,
ny denotes a refractive index in a direction that is orthogonal to the nx direction in the plane direction of each of the first optical compensation layer and the second optical compensation layer, and
nz denotes a refractive index in the thickness direction of each of the first optical compensation layer and the second optical compensation layer, which is orthogonal to each of the nx and ny directions,
Re[450] denotes an in-plane retardation Re (nm) of the first optical compensation layer at a light wavelength of 450 nm, Re[550] denotes an in-plane retardation Re (nm) of the first optical compensation layer at a light wavelength of 550 nm, each of Re[450] and Re[550] is expressed by the following mathematical formula (5), Rth[450] denotes a retardation Rth (nm) in a thickness direction of the second optical compensation layer at a light wavelength of 450 nm, Rth[550] denotes a retardation Rth (nm) in the thickness direction of the second optical compensation layer at a wavelength of 550 nm, and each of Rth[450] and Rth[550] is expressed by the following mathematical formula (6), $$Re=(nx-ny)\times d \qquad (5)$$

$$Rth=(nx-nz)\times d \qquad (6)$$

where in the mathematical formulae (5) and (6), d denotes each of thicknesses (nm) of the first optical compensation layer and the second optical compensation layer, and nx, ny, and nz denote the same as those in the mathematical formulae (1), (2), (3), and (4).

2. The liquid crystal panel according to claim 1, wherein
the liquid crystal cell includes a liquid crystal layer, and
the liquid crystal layer contains liquid crystal molecules that are in homeotropic alignment in the state where no electrical field is present.

3. The liquid crystal panel according to claim 1, wherein a transmittance of the second optical compensation layer at a wavelength of 400 nm is 90% or more.

4. The liquid crystal panel according to claim 1, wherein
the second optical compensation layer contains at least one selected from the group consisting of a polymer having repeating units represented by the following chemical formula (I), a polymer having repeating units represented by the following chemical formula (IA), and stereoisomers thereof,

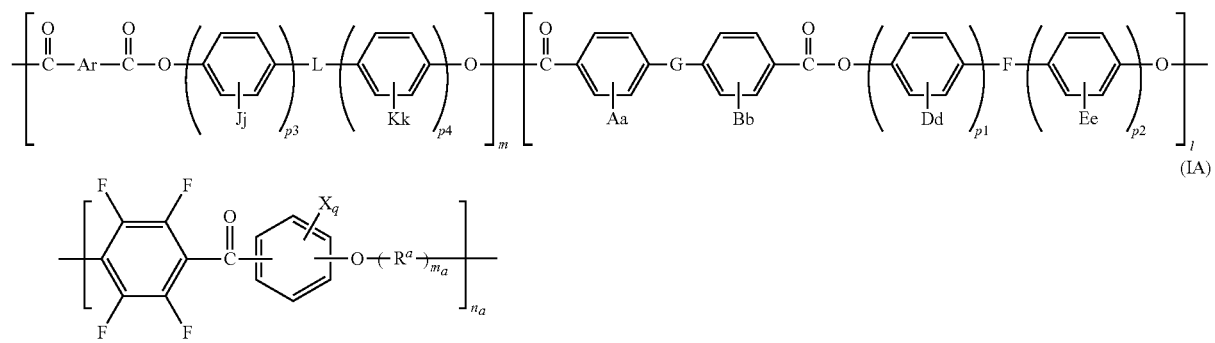

where in the chemical formula (I),

A, B, D, E, J, and K are any substituents, and are identical to or different from each other, a, b, d, e, j, and k are integers of 0 to 4, which represent the number of substituents in A, B, D, E, J, and K, respectively, and are identical to or different from each other, F and L are each a single bond, a vinylene group (—CH═CH—), an ethynylene group (—C≡C—), a methylene group (—CH$_2$—), —CR$_2$— (where Rs are each a straight or branched alkyl group with a carbon number of 1 to 6 or a substituted or unsubstituted aryl group, and are identical to or different form each other), —C(CZ$_3$)$_2$— (where Zs are halogens), a carbonyl group (—CO—), an O atom, a S atom, a sulfonyl group (—SO$_2$—), —SiR$_2$— (where Rs are each a straight or branched alkyl group with a carbon number of 1 to 6 or a substituted or unsubstituted aryl group, and are identical to or different from each other), or —NR— (where R is a straight or branched alkyl group with a carbon number of 1 to 6 or a substituted or unsubstituted aryl group, and are identical to or different from each other), and F and L are identical to or different from each other, G is an atomic group which is capable of π-conjugating to both benzene rings that are adjacent to G or a single bond, Ar is an aromaticity atomic group or an atomic group in which multiple aromaticity atomic groups are bound to each other via bonds or atomic groups which are capable of π-conjugating to each of the aromatic groups, p1, p2, p3, and p4 are integers of 1 to 3, and are identical to or different from each other, and l and m are integers of 1 or more, and are identical to or different from each other, in the chemical formula (IA), X is any substituent, q is an integer of 0 to 4, which represents the number of substituents in X, when multiple Xs are present, they are identical to or different from each other, n$_a$ is an integer of 2 or more, R$^a$ is a group represented by the following chemical formula (IIA), and m$_a$ is an integer of 0 or 1, and

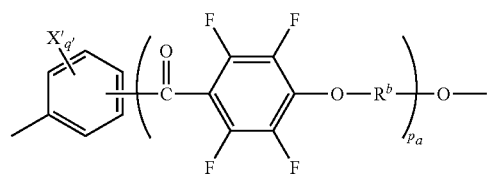

in the chemical formula (IIA),

X' is any substituent, q' is an integer of 0 to 4, which represents the number of substituents in X', when multiple X's are present, they are identical to or different from each other, R$^b$ is a divalent aromatic group, and p$_a$ is an integer of 0 or 1.

5. The liquid crystal panel according to claim 4, wherein
in the chemical formula (I), F and L are each a single bond, a vinylene group (—CH═CH—), an ethynylene group (—C≡C—), a methylene group (—CH$_2$—), —CR$_2$— (where Rs are each a straight or brunched alkyl group with a carbon number of 1 to 6 or a substituted or unsubstituted aryl group, and are identical to or different from each other), —C(CZ$_3$)$_2$— (where Zs are halogens), a carbonyl group (—CO—), an O atom, a S atom, a sulfonyl group (—SO$_2$—), a diethyl silylene group (—Si(CH$_2$CH$_3$)$_2$—), or a methylimino group (—N(CH$_3$)—), and in the chemical formula (IIA), R$^b$ is at least one selected from the group consisting of o-, m-, and p-phenylene groups, and divalent groups derived from naphthalene, biphenyl, anthracene, o-, m-, and p-terphenyl, phenanthrene, dibenzofuran, biphenylether, and biphenyl sulfone, respectively, and in each of these divalent aromatic groups, a hydrogen directly binding to aromatic is optionally substituted with a halogen atom, a straight or branched alkyl group with carbon number of 1 to 6, or a straight or branched alkoxy group with a carbon number of 1 to 6.

6. The liquid crystal panel according to claim 4, wherein in the chemical formula (I), A, B, D, E, J, and K are each a hydrogen atom, a halogen atom, a straight or branched alkyl group with a carbon number of 1 to 6, or a substituted or unsubstituted aryl group, and are identical to or different from each other, and in the chemical formula (IA), X is a halogen atom, a straight or branched alkyl group with a carbon number of 1 to 6, a straight or branched halogenated alkyl group with a carbon number of 1 to 6, a straight or branched alkoxy group with a carbon number of 1 to 6, or a straight or branched halogenated alkoxy group with a carbon number of 1 to 6, and X' is a halogen atom, a straight or branched alkyl group with a carbon number of 1 to 6, a straight or branched halogenated alkyl group with a carbon number of 1 to 6, a straight or branched alkoxy group with a carbon number of 1 to 6, or a straight or branched halogenated alkoxy group with a carbon number of 1 to 6.

7. The liquid crystal panel according to claim 4, wherein the polymer having repeating units represented by the chemical formula (I) is at least one selected from the group consisting of a polymer having repeating units represented by the following chemical formula (II); a polymer having repeating units represented by the following chemical formula (III); a polymer having repeating units represented by the following chemical formula (IV); a polymer having repeating units represented by the following chemical formula (V); a polymer having repeating units represented by the following chemical formula (VI); and stereoisomers thereof, and the polymer having repeating units represented by the chemical formula (IA) is a polymer having repeating units represented by the following chemical formula (IIIA),

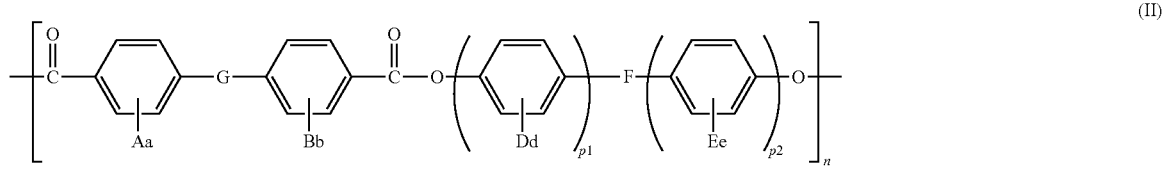

(II)

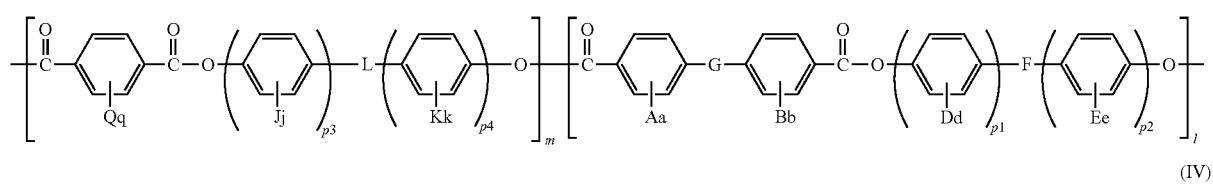

(III)

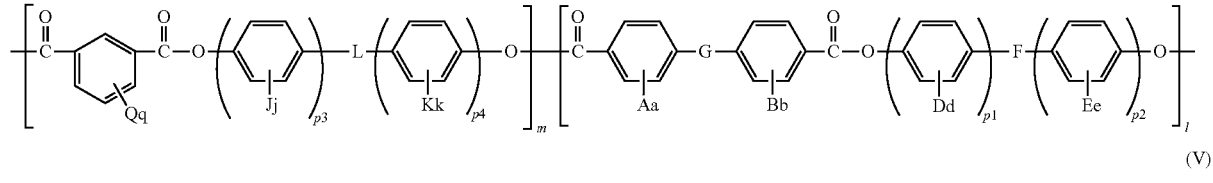

(IV)

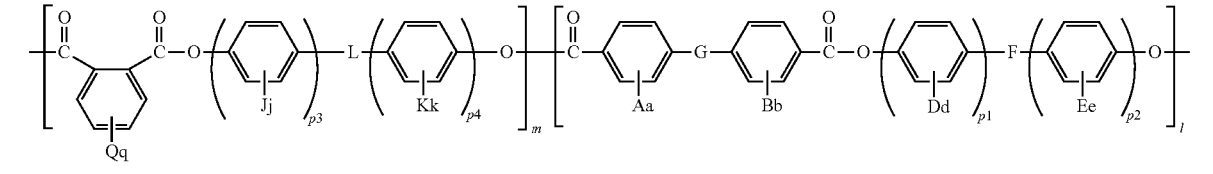

(V)

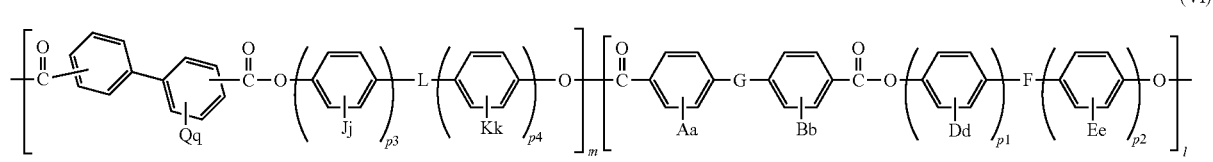

(VI)

(IIIA)

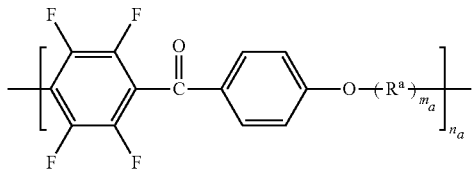

where in the chemical formulae (II), (III), (IV), (V), and (VI),
A, B, D, E, a, b, d, e, F, G, p1, and p2 are the same as those in the chemical formula (I),
in the chemical formula (II),
n is an integer of 2 or more,
in the chemical formulae (III), (IV), (V), and (VI),
J, K, j, k, L, p3, p4, l, and m are the same as those in the chemical formula (I),
Q is any substituent, and is identical to or different from each of A, B, D, E, J, and K,
q is an integer of 0 to 4, which represents the number of substituents in Q, and is identical to or different from each of a, b, d, e, j, and k, and
in the chemical formula (IIIA),
$R^a$, $m_a$, and $n_a$ are the same as those in the chemical formula (IA).

8. The liquid crystal panel according to claim 7, wherein
in the chemical formulae (III), (IV), (V), and (VI),
Q is at least one selected from the group consisting of a hydrogen atom, a halogen atom, a straight or branched alkyl group with a carbon number of 1 to 6, and a substituted or unsubstituted aryl group.

9. The liquid crystal panel according to claim 4, wherein
the polymer having repeating units represented by the chemical formula (I) is at least one selected from the group consisting of a polymer having repeating units represented by the following chemical formula (VII); a polymer having repeating units represented by the following chemical formula (VIII); a polymer having repeating units represented by the following chemical formula (IX); a polymer having repeating units represented by the following chemical formula (X); a polymer having repeating units represented by the following chemical formula (XI); a polymer having repeating units represented by the following chemical formula (VIIB); a polymer having repeating units represented by the following chemical formula (VIIIB); a polymer having repeating units represented by the following chemical formula (IXB); a polymer having repeating units represented by the following chemical formula (XB); a polymer having repeating units represented by the following chemical formula (XIB); and stereoisomers thereof,
where in the chemical formula (IIA),
$R^b$ is at least one aromatic group selected from the group consisting of aromatic groups represented by the following chemical formulae (IVA), (VA), (VIA), (VIIA), (VIIIA), (IXA), and (XA), respectively, (VII)

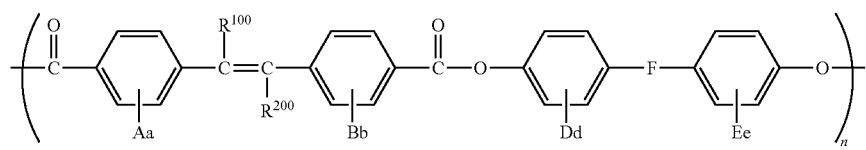

(VIII)

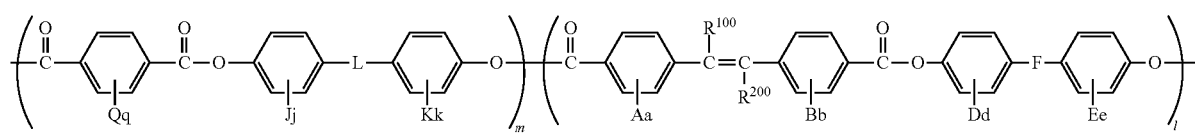

(IX)

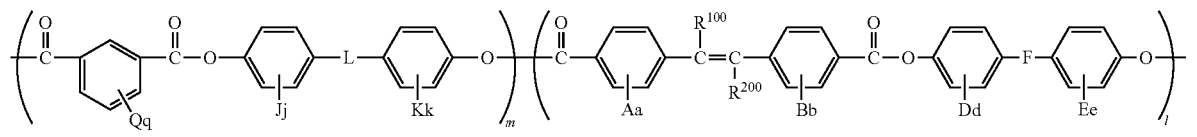

(X)

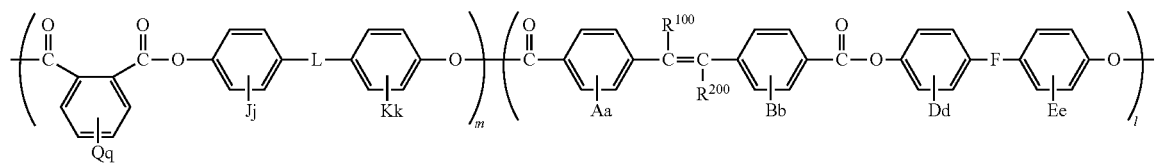

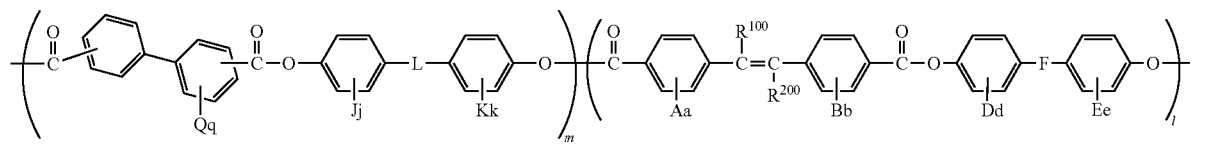
(XI)
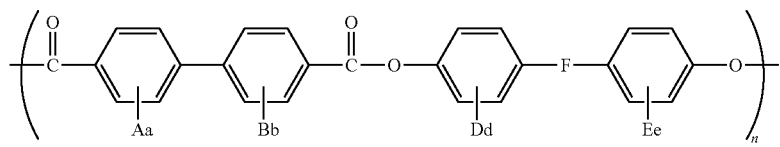
(VIIB)
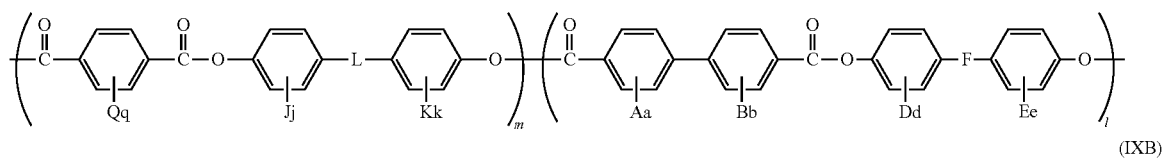
(VIIIB)
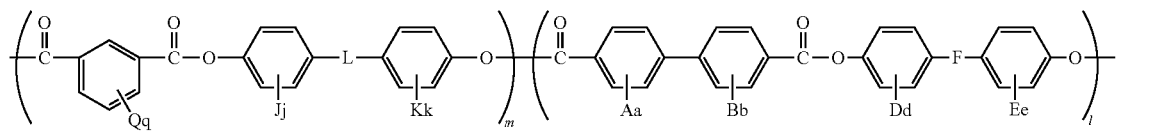
(IXB)
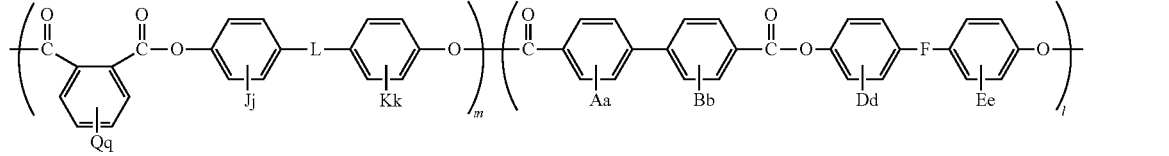
(XB)
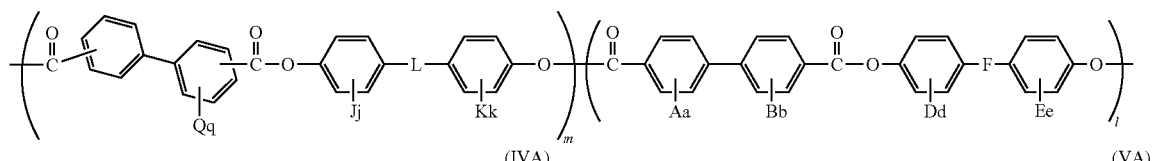
(XIB)
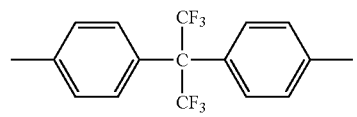
(IVA)
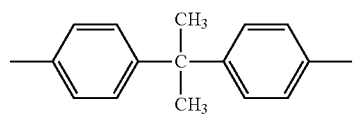
(VA)
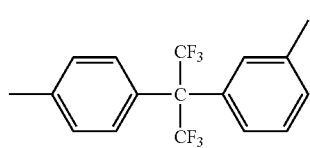
(VIA)
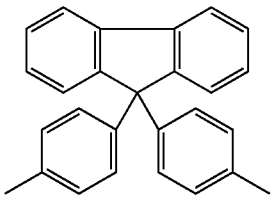
(VIIA)
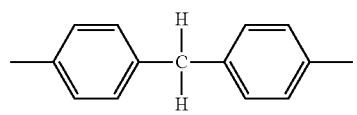
(VIIIA)
(IXA)
(XA)
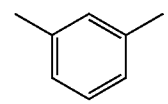

in the chemical formulae (VII), (VIII), (IX), (X), (XI), (VIIB), (VIIIB), (IXB), (XB), and (XIB), A, B, D, E, a, b, d, e, and F are the same as those in the chemical formula (I), in the chemical formulae (VII), (VIII), (IX), (X), and (XI), $R^{100}$ and $R^{200}$ are each a hydrogen atom or a straight or branched alkyl group with a carbon number of 1 to 10, and are identical to or different from each other, in the chemical formulae (VII) and (VIIB), n is an integer of 2 or more, and in the chemical formulae (VIII), (IX), (X), (XI), (VIIIB), (IXB), (XB), and (XIB), J, K, j, k, L, l, and m are the same as those in the chemical formula (I), and Q and q are the same as those in the chemical formulae (III), (IV), (V), and (VI).

10. The liquid crystal panel according to claim 4, wherein the polymer having repeating units represented by the chemical formula (I) is at least one selected from the group consisting of a polymer having repeating units represented by the following chemical formula (XII); a polymer having repeating units represented by the following chemical formula (XIII); a polymer having repeating units represented by the following chemical formula (XIV); a polymer having repeating units represented by the following chemical formula (XV); a polymer having repeating units represented by the following chemical formula (XVI); a polymer having repeating units represented by the following chemical formula (XIIB); a polymer having repeating units represented by the following chemical formula (XIIIB); a polymer having repeating units represented by the following chemical formula (XIVB); a polymer having repeating unite units represented by the following chemical formula (XVB); a polymer having repeating units represented by the following chemical formula (XVIB); and stereoisomers thereof, and in the chemical formula (IA), $R^a$ is a group represented by the following chemical formula (XIA),

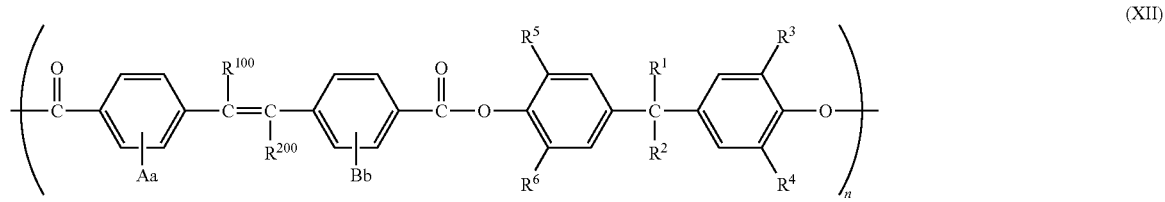

(XII)

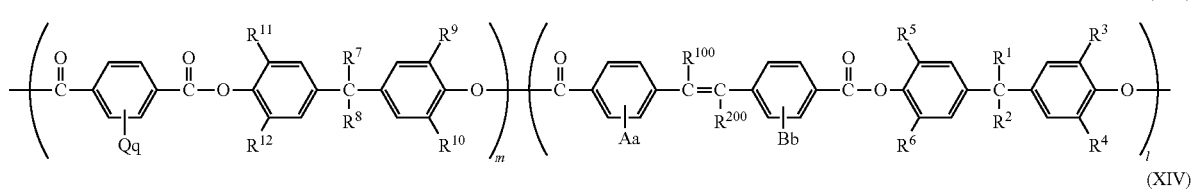

(XIII)

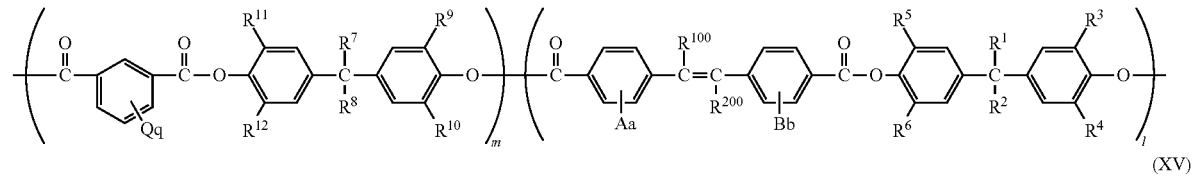

(XIV)

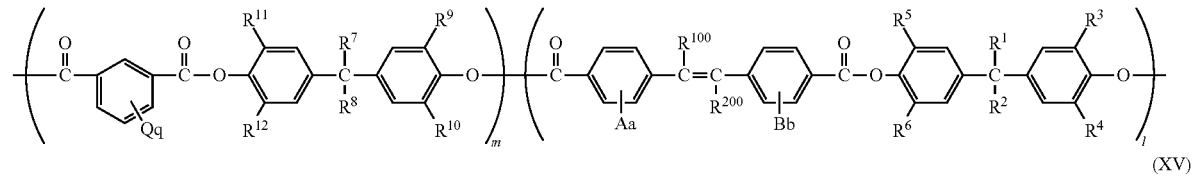

(XV)

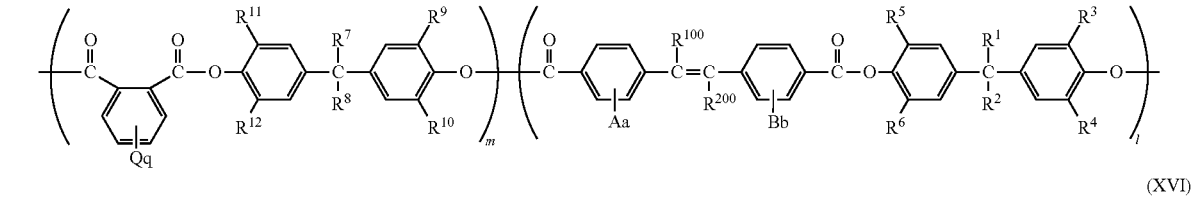

(XVI)

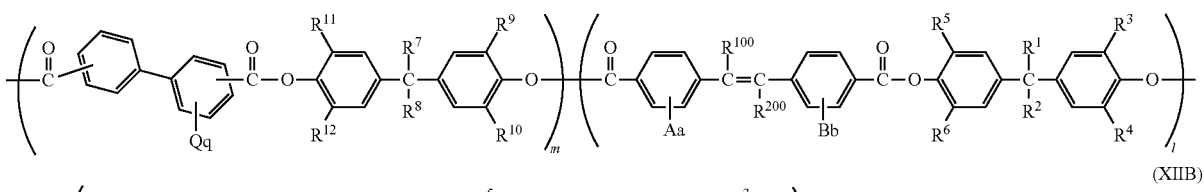

(XIIB)

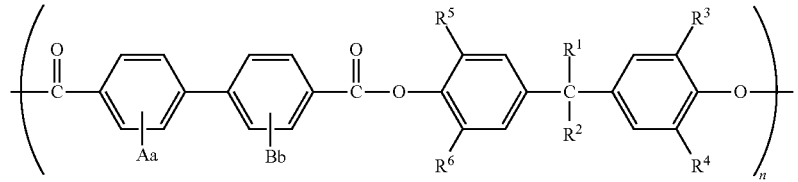

-continued

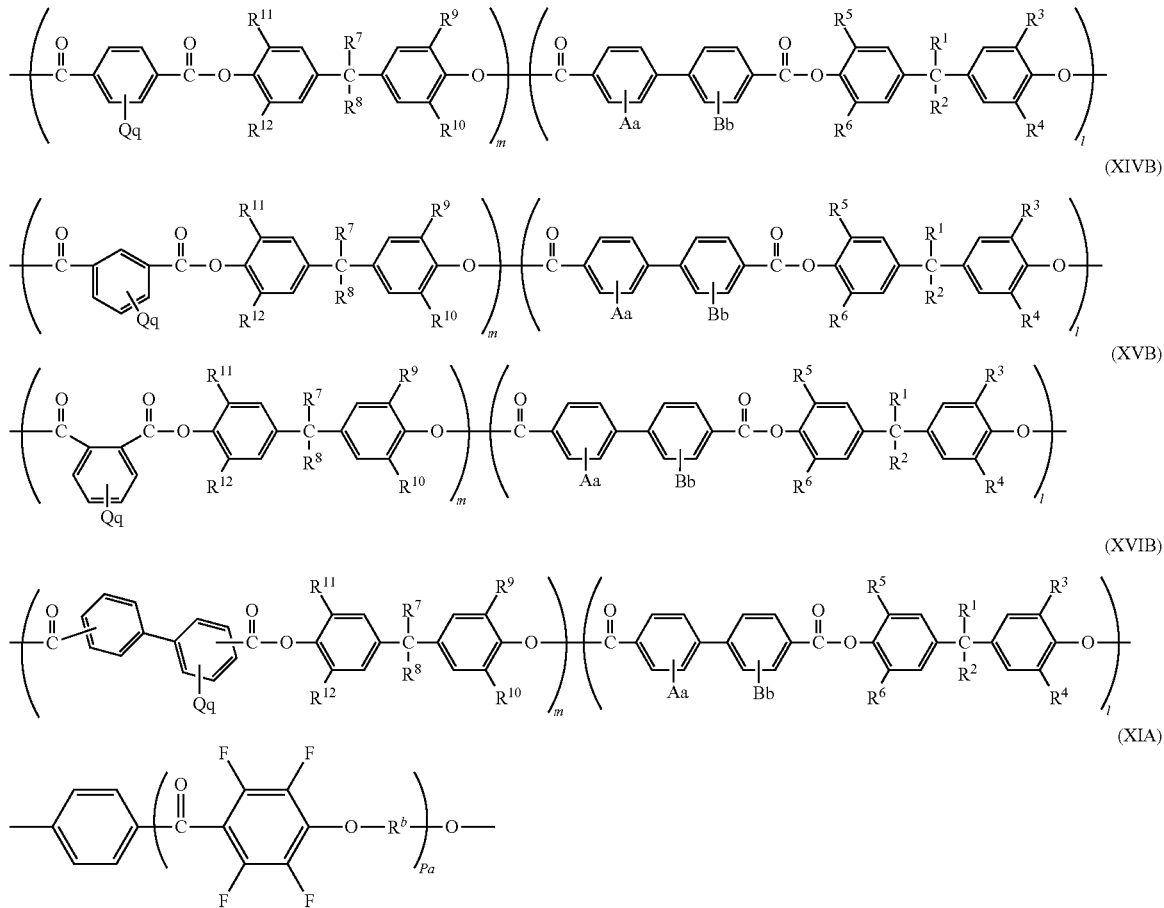

where in the chemical formulae (XII), (XIII), (XIV), (XV), (XVI), (XIIB), (XIIIB), (XIVB), (XVB), and (XVIIB), A, B, a, and b are the same as those in the chemical formula (I), $R^1$ and $R^2$ are each a hydrogen atom, a straight or branched alkyl group with a carbon number of 1 to 10, or a substituted or unsubstituted aryl group, and are identical to or different from each other, and $R^3$ to $R^6$ are each a hydrogen atom, a halogen atom, a straight or brunched alkyl group with a carbon number of 1 to 6, or a substituted or unsubstituted aryl group, and are identical to or different from each other, in the chemical formulae (XII), (XIII), (XIV), (XV), and (XVI), $R^{100}$ and $R^{200}$ are each a hydrogen atom or a straight or branched alkyl group with a carbon number of 1 to 10, and are identical to or different from each other, in the chemical formulae (XII) and (XIIB), n is an integer of 2 or more, in the chemical formulae (XIII), (XIV), (XV), (XVI), (XIIIB), (XIVB), (XVB), and (XVIIB), l and m are the same as those in the chemical formula (I), Q and q are the same as those in the chemical formulae (III) to (VI), $R^7$ and $R^8$ are each a hydrogen atom, a straight or branched alkyl group with a carbon number of 1 to 10, or a substituted or unsubstituted aryl group, and are identical to or different from each other, $R^9$ to $R^{12}$ are each a hydrogen atom, a halogen atom, a straight or branched alkyl group with a carbon number of 1 to 6, or a substituted or unsubstituted aryl group, and are identical to or different from each other, and in the chemical formula (XIA), $R^b$ and $p_a$ are the same as those in the chemical formula (IIA).

11. The liquid crystal panel according to claim 10, wherein in the chemical formulae (XII), (XIII), (XIV), (XV), (XVI), (XIIB), (XIIIB), (XIVB), (XVB), and (XVIIB), $R^2$ is a straight or branched alkyl group with a carbon number of 2 to 10, and at least one of $R^3$ to $R^6$ is not a hydrogen atom, and in the chemical formulae (XIII), (XIV), (XV), (XVI), (XIIIB), (XIVB), (XVB), and (XVIIB), $R^8$ is a straight or branched alkyl group with a carbon number of 2 to 10, and at least one of $R^9$ to $R^{12}$ is not a hydrogen atom.

12. The liquid crystal panel according to claim 10, wherein in the chemical formulae (XII), (XIII), (XIV), (XV), (XVI), (XIIB), (XIIIB), (XIVB), (XVB), and (XVIIB), $R^1$ is a methyl group, and $R^2$ is a straight or branched alkyl group with a carbon number of 2 to 4, and in the chemical formulae (XIII), (XIV), (XV), (XVI), (XIIIB), (XIVB), (XVB), and (XVIIB), $R^7$ is a methyl group, and $R^8$ is a straight or branched alkyl group with a carbon number of 2 to 4.

13. The liquid crystal panel according to claim 10, wherein
in the chemical formulae (XII), (XIII), (XIV), (XV), (XVI), (XIIB), (XIIIB), (XIVB), (XVB), and (XVIB),
$R^3$ and $R^5$ are each a straight or branched alkyl group with a carbon number of 1 to 4, and are identical to or different from each other, and
$R^4$ and $R^6$ are each a hydrogen atom or a straight or branched alkyl group with a carbon number of 1 to 4, and are identical to or different from each other, and
in the chemical formulae (XIII), (XIV), (XV), (XVI), (XIIIB), (XIVB), (XVB), and (XVIB),
$R^9$ and $R^{11}$ are each a straight or branched alkyl group with a carbon number of 1 to 4, and are identical to or different from each other, and
$R^{10}$ and $R^{12}$ are each a hydrogen atom or a straight or branched alkyl group with a carbon number of 1 to 4, and are identical to or different from each other.

14. The liquid crystal panel according to claim 10, wherein
in the chemical formulae (XII), (XIII), (XIV), (XV), (XVI), (XIIB), (XIIIB), (XIVB), (XVB), and (XVIB),
$R^3$ to $R^6$ are each a straight or branched alkyl group with a carbon number of 1 to 4, and are identical to or different from each other, and
in the chemical formulae (XIII), (XIV), (XV), (XVI), (XIIIB), (XIVB), (XVB), and (XVIB),
$R^9$ to $R^{12}$ are each a straight or branched alkyl group with a carbon number of 1 to 4, and are identical to or different from each other.

15. The liquid crystal panel according to claim 4, wherein
the polymer having repeating units represented by the chemical formula (I) is at least one selected from the group consisting of a polymer having repeating units represented by the following chemical formula (XVIII); a polymer having repeating units represented by the following chemical formula (XIX); a polymer having repeating units represented by the following chemical formula (XX); a polymer having repeating units represented by the following chemical formula (XXIII); and stereoisomer thereof, and
the polymer having repeating units represented by the chemical formula (IA) is at least one selected from the group consisting of: a polymer having repeating units represented by the following chemical formula (XIIIA); a polymer having repeating units represented by the following chemical formula (XIVA); a polymer having repeating units represented by the following chemical formula (XVA); a polymer having repeating units represented by the following chemical formula (XVIA); and stereoisomers thereof,

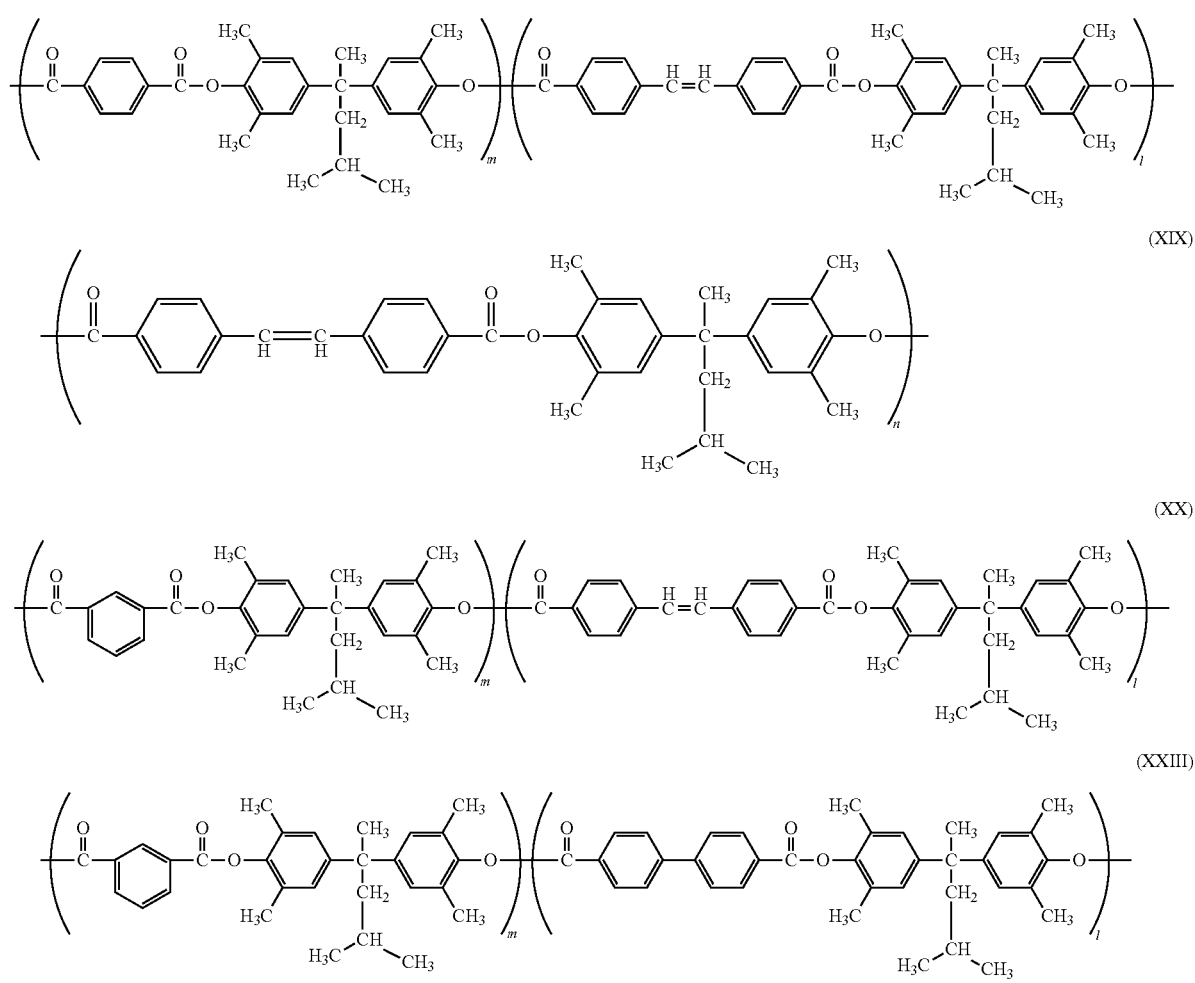

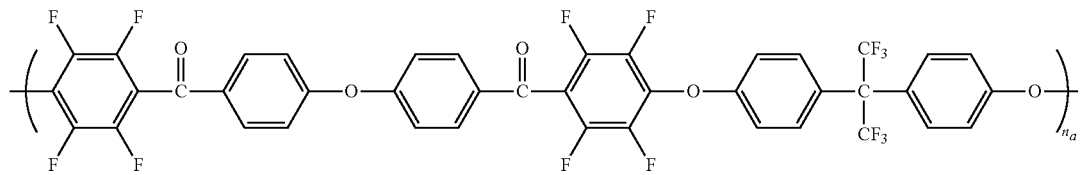
(XIIIA)

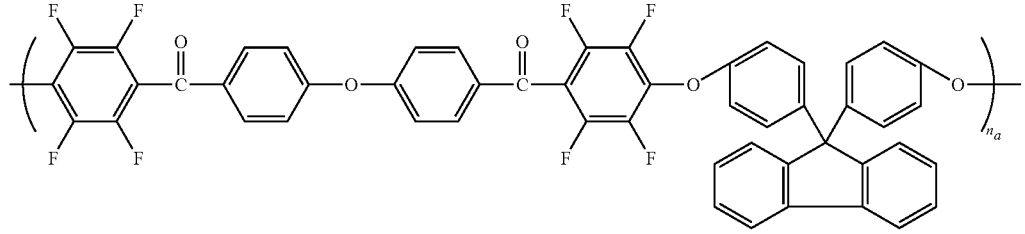
(XIVA)

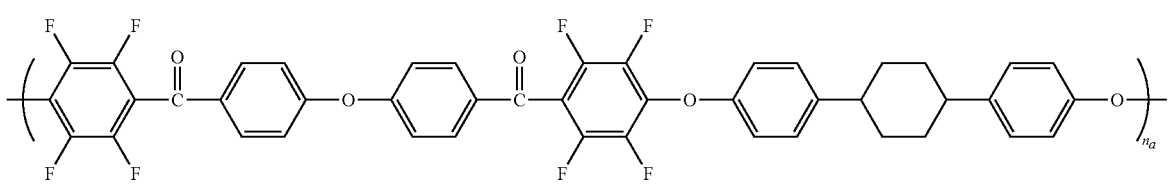
(XVA)

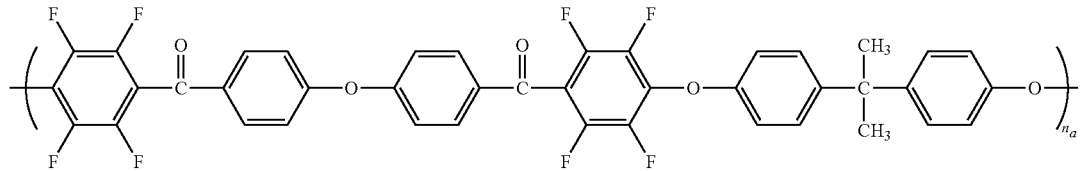
(XVIA)

where in the chemical formulae (XVIII), (XX), and (XXIII),
l and m are the same as those in the chemical formula (I),
in the chemical formula (XIX),
n is an integer of 2 or more, and
in the chemical formulae (XIIIA), (XIVA), (XVA), and (XVIA),
$n_a$ is the same as that in the chemical formula (IA).

16. The liquid crystal panel according to claim 4, wherein each of the polymer having repeating units represented by the chemical formula (I) and the polymer having repeating units represented by the chemical formula (IA) is a non-halogenated polymer having a polymer structure including no halogen atom.

17. The liquid crystal panel according to claim 4, wherein each of the polymer having repeating units represented by the chemical formula (I) and the polymer having repeating units represented by the chemical formula (IA) is a polymer that is soluble in at least one of toluene and ethyl acetate.

18. A liquid crystal display, comprising the liquid crystal panel according to claim 1.

* * * * *